United States Patent
Chen et al.

(10) Patent No.: US 10,999,869 B2
(45) Date of Patent: May 4, 2021

(54) USER EQUIPMENT AND BASE STATION

(71) Applicant: Institute For Information Industry, Taipei (TW)

(72) Inventors: Chiu-Wen Chen, Taipei (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/034,339

(22) Filed: Jul. 12, 2018

(65) Prior Publication Data

US 2019/0021120 A1 Jan. 17, 2019

Related U.S. Application Data

(60) Provisional application No. 62/531,877, filed on Jul. 13, 2017.

(51) Int. Cl.
| | | |
|---|---|---|
| *H04W 74/08* | (2009.01) | |
| *H04W 76/27* | (2018.01) | |
| *H04L 5/00* | (2006.01) | |
| *H04W 88/08* | (2009.01) | |
| *H04W 88/02* | (2009.01) | |

(52) U.S. Cl.
CPC ....... *H04W 74/0833* (2013.01); *H04L 5/0048* (2013.01); *H04L 5/0051* (2013.01); *H04W 76/27* (2018.02); *H04L 5/0053* (2013.01); *H04W 88/02* (2013.01); *H04W 88/08* (2013.01)

(58) Field of Classification Search
CPC .. H04W 74/0833; H04W 76/27; H04L 5/0048
See application file for complete search history.

(56) References Cited

U.S. PATENT DOCUMENTS

| | | | | |
|---|---|---|---|---|
| 2014/0086176 A1* | 3/2014 | Liu | ............. | H04W 74/006 370/329 |
| 2018/0302928 A1* | 10/2018 | Axen | ............. | H04W 74/006 |
| 2019/0320467 A1* | 10/2019 | Freda | ............. | H04W 74/0833 |

OTHER PUBLICATIONS

Office Action to the corresponding Taiwan Patent Application No. 107124103 rendered by the Taiwan Intellectual roperty Office (TIPO) dated Dec. 27, 2018, 15 pages.

* cited by examiner

*Primary Examiner* — Yemane Mesfin
*Assistant Examiner* — Henry Baron
(74) *Attorney, Agent, or Firm* — Skaar Ulbrich Macari, P.A.

(57) ABSTRACT

A user equipment (UE) and a base station (BS) are provided. The UE transmits a specific preamble on a random access channel and transmits an uplink data signal and a demodulation reference signal (DMRS) on an uplink transmission radio resource so that the BS receives the uplink data signal and the DMRS according to the specific preamble after receiving the specific preamble. The BS transmits a downlink data signal on a downlink transmission radio resource according to the specific preamble so the UE receives the downlink data signal on the downlink transmission radio resource according to the specific preamble.

20 Claims, 23 Drawing Sheets

USER EQUIPMENT AND BASE STATION

PRIORITY

This application claims priority to U.S. Provisional Patent Application No. 62/531,877 filed on Jul. 13, 2017, which is hereby incorporated by reference in its entirety.

FIELD

The present invention relates to a user equipment (UE) and a base station (BS). Specifically, the BS of the present invention may allocate a specific preamble to make a UE capable of directly transmitting an uplink data signal to the BS and receiving a downlink data signal from the BS based on the specific preamble.

BACKGROUND

With the development of the technology, various electronic products are ubiquitous in people's daily life. To achieve the communication between the electronic products and provide various applications, the wireless communication technology has become the essential key technology. The next generation of mobile communication system (which is commonly called 5G mobile communication system currently) provide new service types, e.g., Ultra-reliable and Low Latency Communication (URLLC), Enhanced Mobile Broadband (eMBB) Communication, Massive Machine Type Communication (mMTC) or the like.

Automotive communication or industrial communication (e.g., smart vehicles or smart factories) has requirements of reducing the signal transmission delay and shortening the signal processing time so as to achieve real-time control. Therefore, the URLLC service is quite suitable for the automotive communication or industrial communication to provide ultra-reliable and low latency communication. However, how to achieve ultra-reliable and low latency communication in the URLLC service is still a critical issue in the art and current communication standards have no perfect solution for this issue.

On the other hand, as compared to the LTE communication system which is the current mainstream communication system, the 5G mobile communication system additionally set a radio resource control (RRC) inactive state between an RRC connected state and an RRC idle state to shorten the time for the UE to return back to the RRC connected state. However, when the UE is in the RRC inactive state and an uplink data signal needs to be transmitted or a downlink data signal needs to be received, whether it is necessary to return back to the RRC connected state in order to perform ultra-reliable and low latency communication is another critical issue in the art.

Accordingly, an urgent need exists in the art to provide a transmission mechanism so as to provide the UE with ultra-reliable and low latency communication even if the UE is in the RRC inactive state.

SUMMARY

An objective of certain embodiments of the invention is to provide a transmission mechanism in which a user equipment (UE) may directly transmit an uplink data signal and a demodulation reference signal after transmitting a specific preamble, thereby satisfying requirements of low latency transmission. After receiving the specific preamble, the base station (BS) receives the uplink data signal and the demodulation reference signal on an uplink transmission radio resource and transmits a downlink data signal on a downlink transmission radio resource according to the specific preamble. Meanwhile, the UE receives the downlink data signal according to the specific preamble. In addition, the present invention is also applicable to signal transmission when the UE is in the RRC inactive state. Accordingly, the transmission mechanism of the present invention not only can reduce the data transmission delay between the UE and the BS, but also can enable the UE to remain at a low power consumption mode to perform signal transmission, and the UE does not need to transit to the RRC connected state due to the need for sporadic transmission.

The disclosure includes a UE which comprises a storage, a transceiver and a processor. The processor is electrically connected to the storage and the transceiver and is configured to perform the following operations: transmitting, via the transceiver, a specific preamble on a random access channel (RACH), and an uplink data signal and a demodulation reference signal (DMRS) on an uplink transmission radio resource to make a BS (BS) receive the uplink data signal and the DMRS according to the specific preamble after receiving the specific preamble, wherein the specific preamble is configured by the BS; and receiving, via the transceiver, a downlink data signal on a downlink transmission radio resource according to the specific preamble.

The disclosure further includes a BS which comprises a storage, a transceiver and a processor. The processor is electrically connected to the storage and the transceiver and is configured to perform the following operations: receiving, via the transceiver, a specific preamble on a random access channel (RACH), and an uplink data signal and a demodulation reference signal (DMRS) on an uplink transmission radio resource according to the specific preamble; and transmitting, via the transceiver, a downlink data signal on a downlink transmission radio resource according to the specific preamble. The specific preamble is configured by the BS for a UE.

The detailed technology and preferred embodiments implemented for the present invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific example, embodiment, environment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 1:
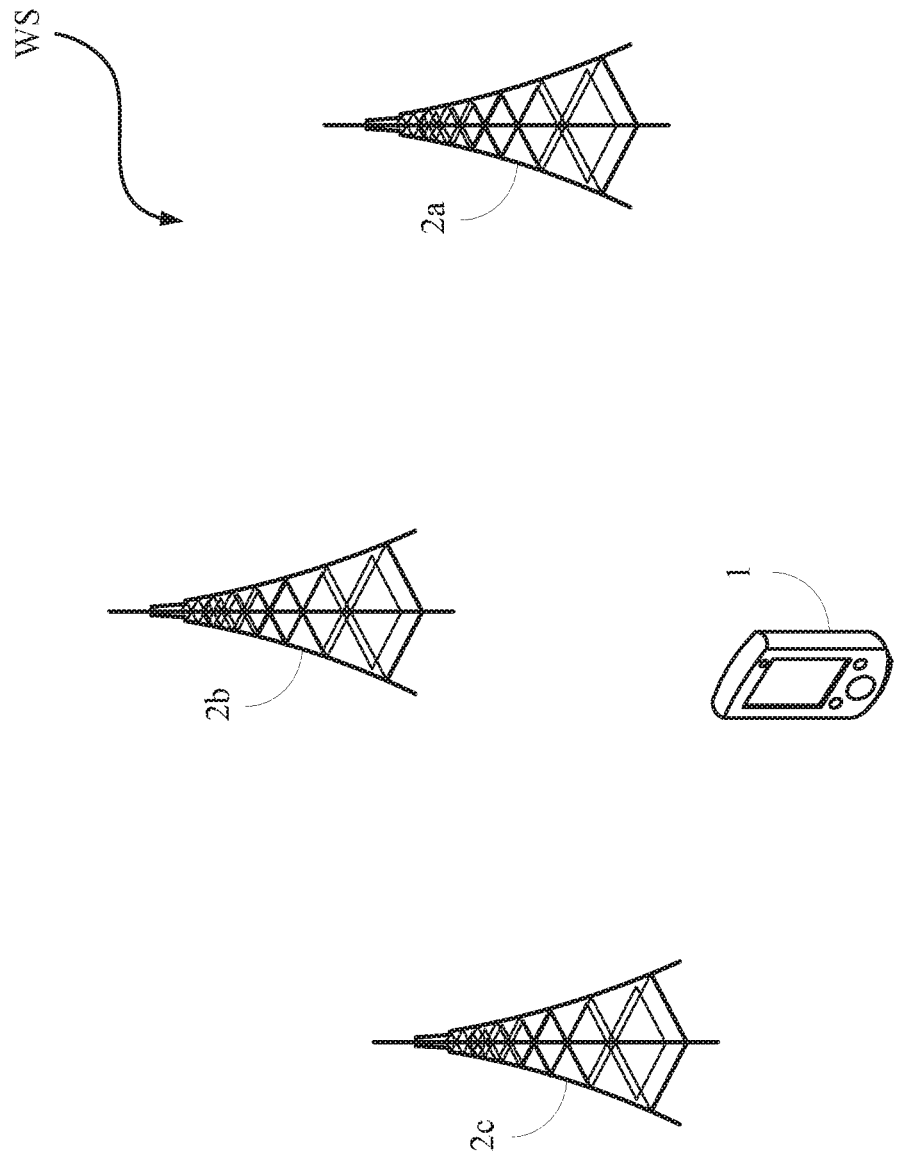
FIG. 1 depicts an implementation scenario of a wireless communication system according to the present invention.
Figure 2:
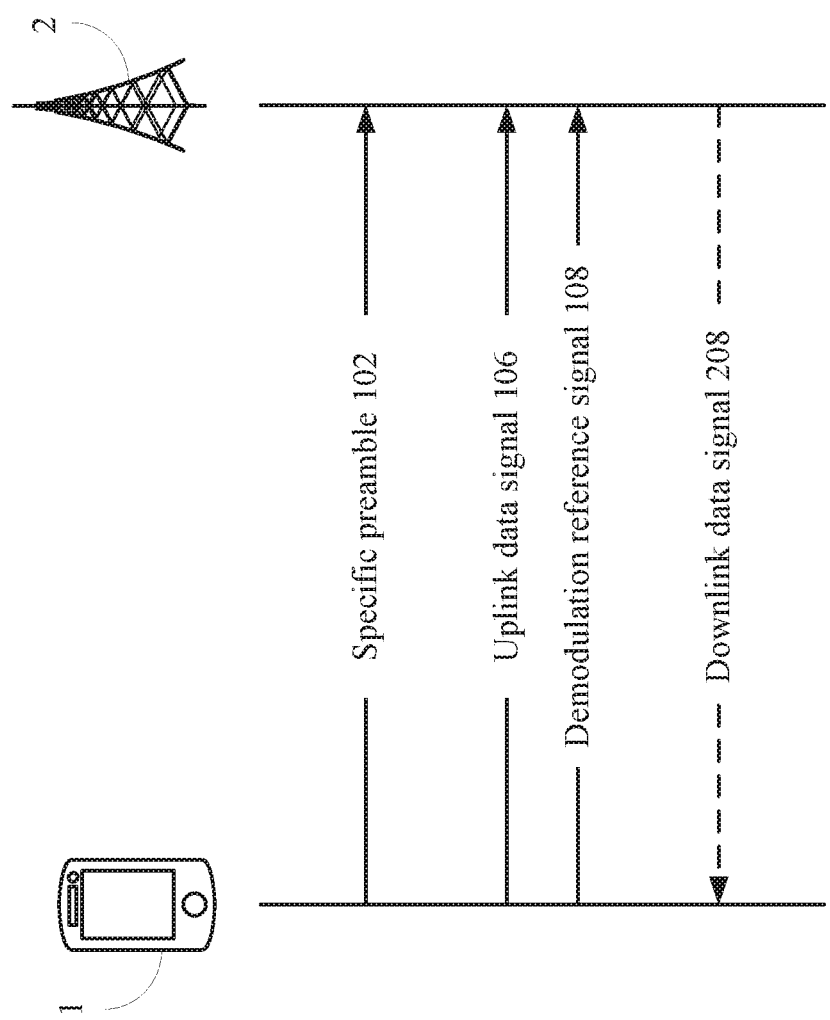
FIG. 2 depicts an implementation scenario of signal transmission between a user equipment (UE) 1 and a base station (BS) 2 according to the present invention.

A first embodiment of the present invention is as shown in FIG. 1 and FIG. 2. FIG. 1 depicts an implementation scenario of a wireless communication system WS according to the present invention. FIG. 2 depicts an implementation scenario of signal transmission between a user equipment (UE) 1 and a base station (BS) 2 according to the present invention. It shall be appreciated that, in FIG. 2, the BS 2 may be any of BSs 2*a*, 2*b* and 2*c*. For simplification of the description, FIG. 2 only depicts signal transmission between a single UE 1 and the BS 2 as an example for illustration. As shall be appreciated by those of ordinary skill in the art based on the following description, the BS 2 may also perform signal transmission with other UEs at the same time, and this will not be further described herein.

As shown in FIG. 1, each of the BSs 2*a*, 2*b* and 2*c* in the wireless communication system WS has a signal coverage region, and the UE 1 is located within the signal coverage regions of the BSs 2*a*, 2*b* and 2*c*. For simplification of the description, only three BSs 2*a*, 2*b* and 2*c* are depicted in FIG. 1. However, the number of the BSs is not intended to limit the present invention. The wireless communication system WS may be a mobile communication system based on the Orthogonal Frequency Division Multiple Access (OFDMA) technology, e.g., the next generation mobile communication system (which is generally called the 5G mobile communication system currently). The UE 1 may be a smart phone, a tablet computer or any mobile communication device conforming to specifications of the mobile communication system, e.g., a UE supporting ultra-reliable low latency communication (URLLC) service (which is called a URLLC UE hereinafter), but it is not limited thereto.

In this embodiment, in order to enable the UE 1 to transmit an uplink data to the BS 2 rapidly and in real time without the need of requesting a transmission resource from the BS 2 (i.e., in an uplink grant-free condition), the BS 2 may pre-configure an uplink transmission radio resource to make the UE 1 capable of directly transmitting an uplink data signal 106 and a demodulation reference signal (DMRS) 108 on the uplink transmission radio resource pre-configured by the BS 2 after transmitting a specific preamble 102 on a random access channel (RACH). In detail, the pre-configured radio resource may be a semi-persistent scheduling (SPS) resource to be used by multiple UEs for uplink data signal transmission in the uplink grant-free condition. The pre-configured radio resource is configured periodically from radio resources that can be utilized by the BS 2.

The specific preamble 102 is configured by the BS 2 when the UE 1 is in the RRC connected state, and the specific preamble 102 has a correspondence relationship with the uplink transmission radio resource and the downlink transmission radio resource. Thus, after receiving the specific preamble 102, based on the correspondence relationship between the specific preamble 102 and the uplink and downlink transmission radio resources, the BS 2 may receive the uplink data signal 106 and the demodulation reference signal 108 on the uplink transmission radio resource, and the BS 2 may transmit a downlink data signal 208 on the downlink transmission radio resource if the BS 2 needs to transmit the downlink data signal 208 to the UE 1.

Moreover, the UE 1 also receives the downlink data signal 208 on the downlink transmission radio resource according to the specific preamble 102 (i.e., according to the correspondence relationship), as shown in FIG. 2. Additionally, the demodulation reference signal 108 is also dedicatedly configured by the BS 2 when the UE 1 is in the RRC connected state, so the BS 2 can identify the UE 1 through a port and sequence of the demodulation reference signal 108. The configuration of the demodulation reference signal 108 shall be readily appreciated by those of ordinary skill in the art based on the above description, and thus will not be further described herein.

It shall be appreciated that, the aforesaid transmission mechanism is applicable no matter the UE is in which transmission state. However, when the UE is in the RRC inactive state or the RRC idle state, the transmission mechanism of the present invention may enable the UE to remain in the RRC inactive state or the RRC idle state, and the UE does not need to transit to the RRC connected state due to the need for sporadic transmission. But when the BS 2 is a BS (e.g., gNB) belonging to the next generation of mobile communication system (that is commonly called the 5G mobile communication system currently), the UE may be in the RRC connected state, the RRC inactive state or the RRC idle state.

Figure 3A:
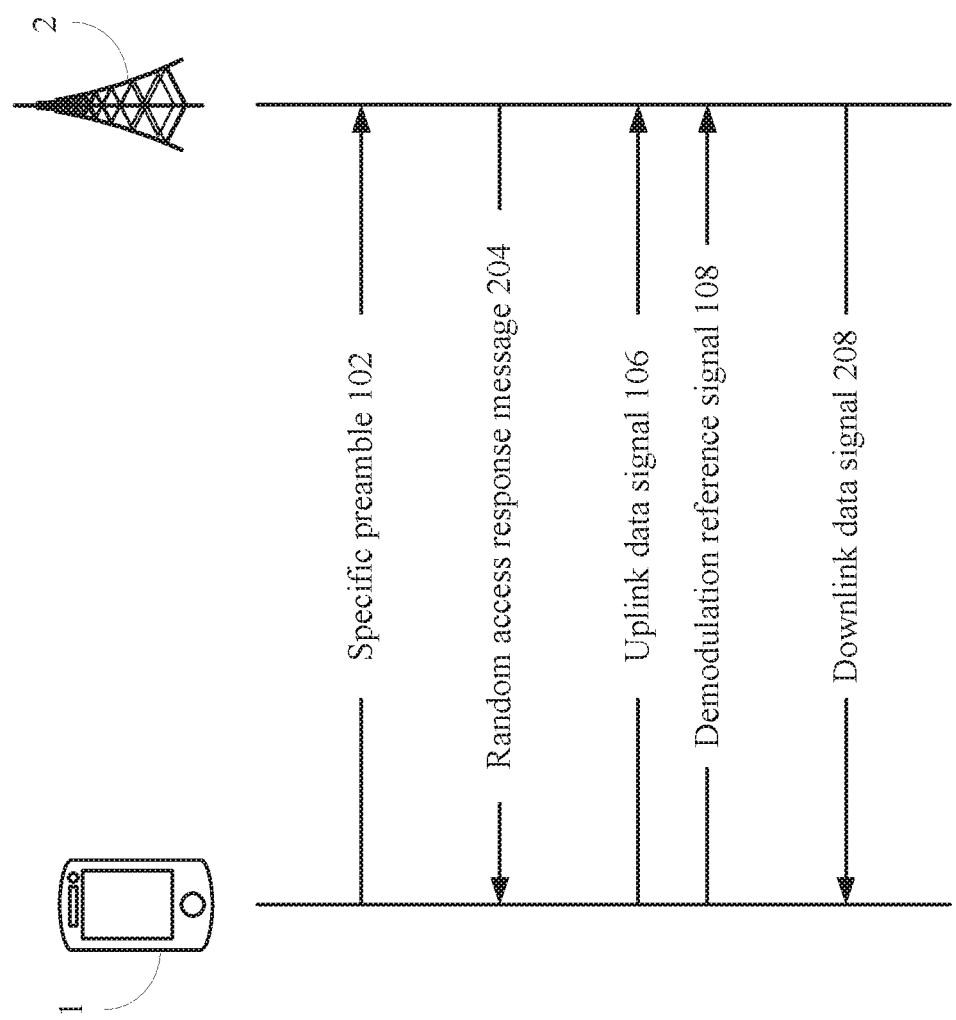
FIG. 3A to FIG. 3B depict implementation scenarios of signal transmission between the UE 1 and the BS 2 according to the present invention.
Figure 3B:
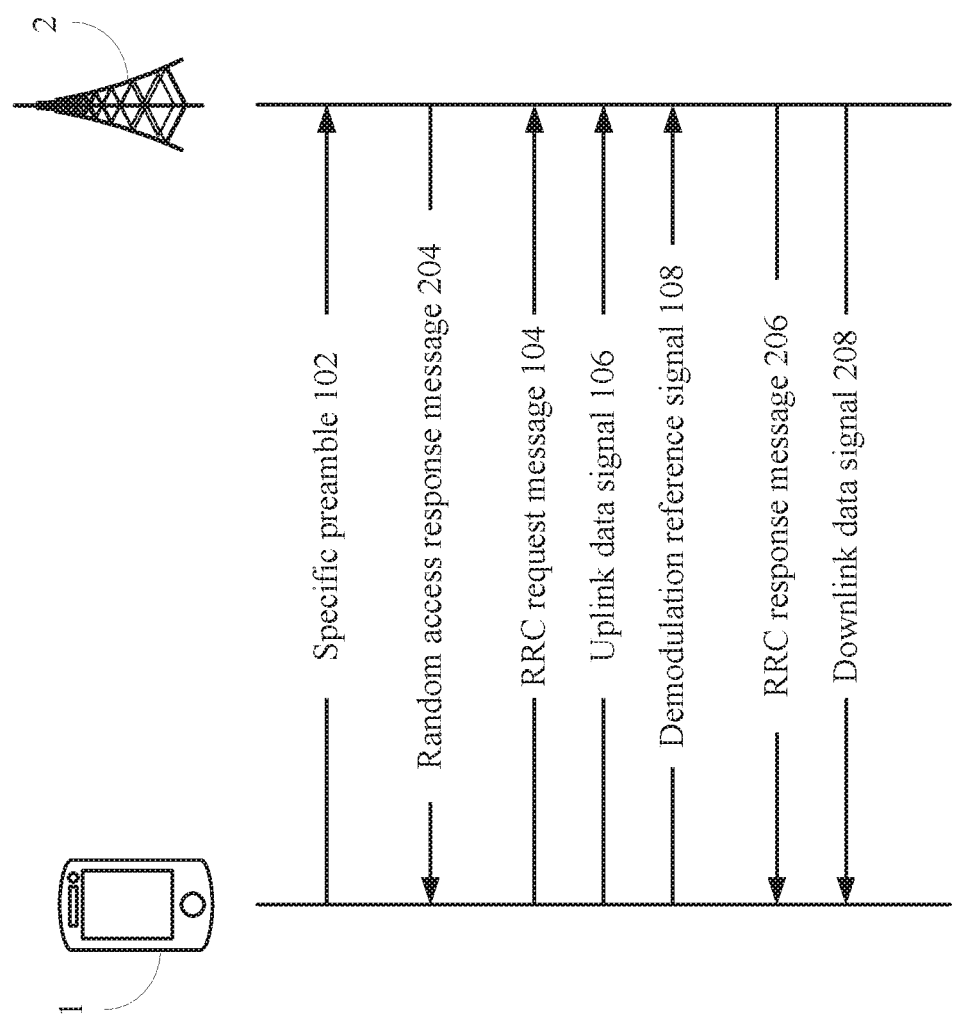

A second embodiment of the present invention is as shown in FIG. 3A and FIG. 3B, which respectively depict implementation scenarios of signal transmission between the UE 1 and the BS 2 according to the present invention. In the implementation scenario of FIG. 3A, the correspondence relationship between the uplink and downlink transmission radio resources and the specific preamble 102 is generated in response to that the BS 2 configures the uplink transmission radio resource and the downlink transmission radio resource to the UE 1 after receiving the specific preamble 102. Specifically, the BS 2 configures the uplink transmission radio resource after receiving the specific preamble 102, and informs the UE 1 of the uplink transmission radio resource information via a random access response (RAR) message 204. In other words, the BS 2 configures the uplink transmission radio resource according to the specific preamble 102, and then receives the uplink data signal 106 and the demodulation reference signal 108 on the uplink transmission radio resource. After receiving the RAR message 204, the UE 1 may transmit the uplink data signal 106 and the demodulation reference signal 108 on the uplink transmission radio resource configured by the BS 2 according to the uplink transmission radio resource information.

Additionally, when the BS 2 needs to transmit the downlink data signal 208 to the UE 1, the random access response message 204 may also carry the downlink transmission radio resource information. The downlink transmission radio resource information may directly indicate the downlink transmission radio resource to inform the UE 1 of the position of the downlink transmission radio resource for receiving the downlink data signal 208 so that the UE 1 can learn where to retrieve the downlink data signal 208. Moreover, in other embodiments, the BS 2 may also carry information for retrieving downlink control information (DCI) from a search space on a physical downlink control channel (e.g., a temporary UE identifier (ID)) in the random access response message 204 according to the specific preamble 102, and transmit the DCI on the physical downlink control channel to enable the UE 1 to retrieve the DCI in the corresponding search space and thereby learn the downlink transmission radio resource. Additionally, in other embodiments, the downlink transmission radio resource may be learned according to the correspondence relationship with the specific preamble 102, as described in the first embodiment. In other words, the uplink transmission radio resource information is learned from the random access response message 204, while the downlink transmission radio resource information is implied by the specific preamble 102.

In the implementation scenario of FIG. 3B, the UE 1 is in the RRC inactive state and requests to transit back into the RRC connected state. In this case, the UE 1 may further transmit an RRC request message 104 to the BS 2 on the uplink transmission radio resource. The RRC request message 104 carries an access stratum context identifier (AS context ID), and the BS 2 may identify the UE 1 according to the access stratum context identifier.

Because the RRC request message 104 is used for requesting to transit back into the RRC connected state, the access stratum context identifier is used as an RRC connection resume identifier. In this way, after receiving the RRC request message 104, the BS 2 may generate an RRC response message 206 and transmit the RRC response message 206 to the UE 1 on the downlink transmission radio resource so that the UE 1 transits back into the RRC connected state according to information carried by the RRC response message 206.

It shall be appreciated that, the RRC request message 104, the uplink data signal 106 and the demodulation reference signal 108 are transmitted on different blocks of the uplink transmission radio resource (and may be transmitted in a certain order or transmitted simultaneously in the time-frequency domain), so the way in which the RRC request message 104, the uplink data signal 106 and the demodulation reference signal 108 are presented in the attached drawings does not represent the absolute order in which they are transmitted.

Additionally, in an embodiment, when there is a one-to-one correspondence relationship between the specific preamble 102 and the UE (i.e., the specific preamble 102 dedicatedly belongs to the UE 1), the RAR message 204 may further carry DMRS configuration information to be used by the UE 1 for transmitting the demodulation reference signal 108. In other words, the BS 2 may also update the DMRS configuration via the RAR message 204. In other embodiments, when the UE 1 is in the RRC idle state and requests to transit back into the RRC connected state, the RRC request message 104 is an RRC connection request message that carries an initial UE identity of the UE 1 so that the BS 2 can accordingly identify the identity of the UE 1, and the RRC response message 206 is an RRC connection setup message to inform the UE 1 of configuration parameters about setting up the RRC connection.

Figure 4:
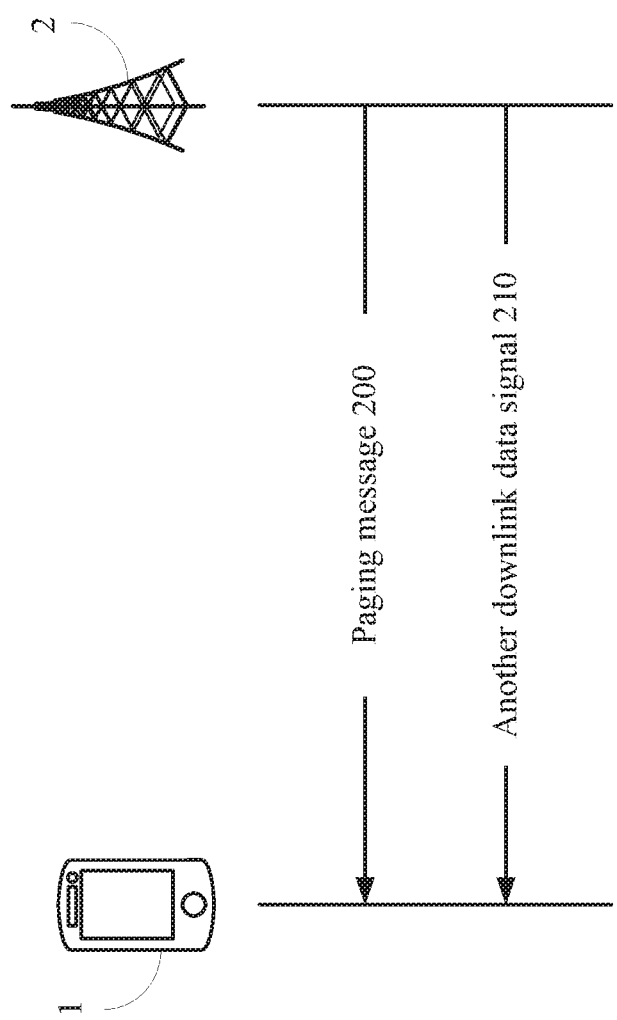
FIG. 4 depicts an implementation scenario of signal transmission between the UE 1 and the BS 2 according to the present invention.

A third embodiment of the present invention is as shown in FIG. 4. When the UE 1 is not in the RRC connected state, the BS 2 may transmit a paging message 200 to the UE 1 first if the BS 2 intends to transmit another downlink data signal 210 to the UE 1. The paging message 200 indicates the specific preamble 102. As described previously, because the specific preamble 102 has a correspondence relationship with the uplink transmission radio resource and the downlink transmission radio resource, in response to the paging message 200, the UE 1 may receive another downlink data signal 210 on the downlink transmission radio resource according to the correspondence relationship when the paging message 200 indicates the specific preamble 102.

Figure 5:
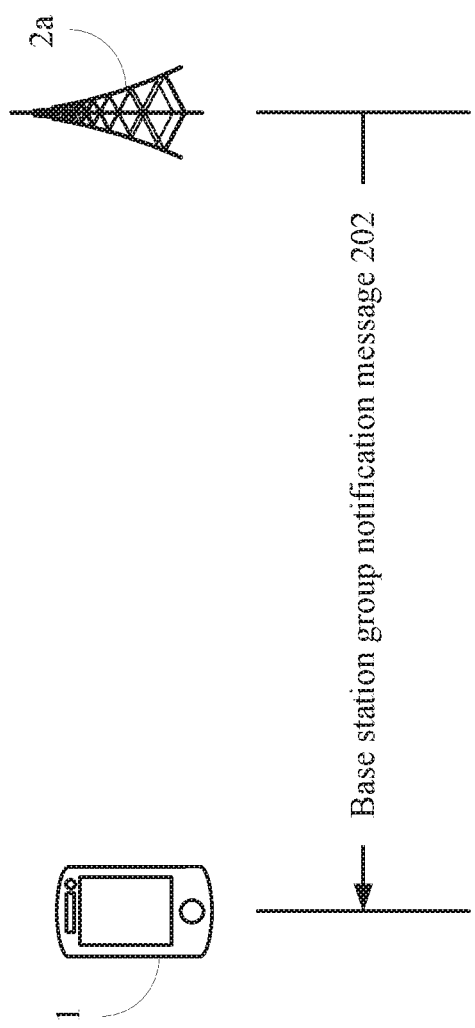
FIG. 5 depicts an implementation scenario of setting up a BS group between the UE 1 and a BS 2a according to the present invention.
Figure 6:
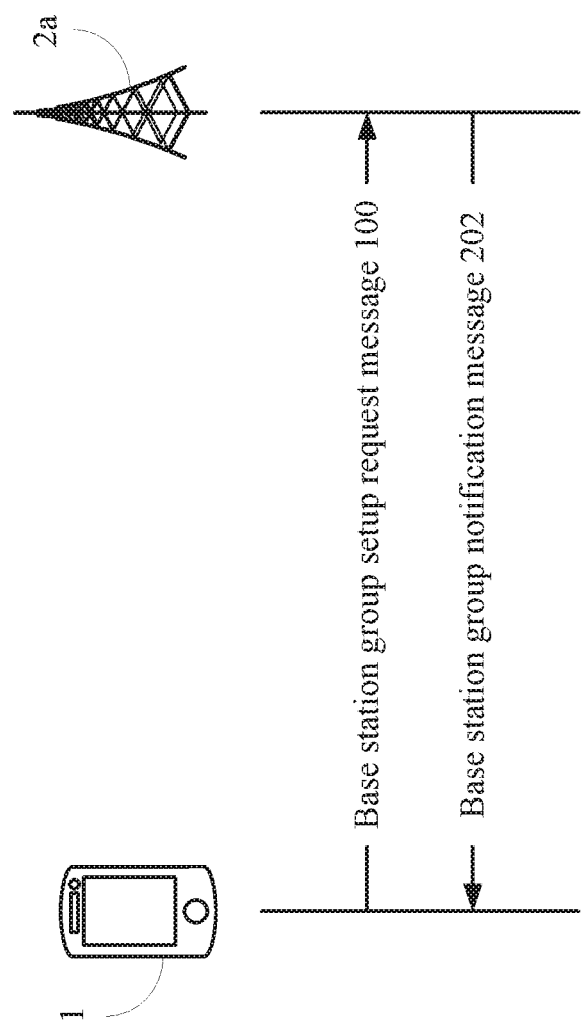
FIG. 6 depicts an implementation scenario of setting up a BS group between the UE 1 and the BS 2a according to the present invention.

A fourth embodiment of the present invention is as shown in FIG. 5 and FIG. 6. This embodiment takes the case where the BS 2 is the BS 2a as an example for illustration. After the RRC connection is established between the UE 1 and the BS 2a, the UE 1 receives a BS group notification message 202 from the BS 2a. The BS group notification message 202 indicates a BS group which comprises the BS 2a and at least one other BS (e.g., the BSs 2b and 2c). The BSs 2a, 2b and 2c in the BS group all store the access stratum context of the UE 1. The access stratum context is created by the BS 2a after the RRC connection is established between the BS 2a and the UE 1. If the UE 1 is in the RRC connected state, the BS 2a may transmit the access stratum context of the UE 1 to the BSs 2b and 2c for setting up a BS group when the BS 2a further determines to provide the UE 1 with dual connectivity service of high reliability. Thus, the UE 1 may perform signal transmission via dual connectivity in the RRC connected state or in the RRC inactive state. It shall be appreciated by those of ordinary skill in the art that direct communication connection or communication connection via a backhaul device may exist between the BSs 2a, 2b and 2c, so the BSs 2a, 2b and 2c may communicate with each other to share information.

In the present invention, the setup of the BS group focuses on the fact that the UE 1 may achieve transmission of high reliability in the RRC inactive state, so the BS group indicated by the BS group notification message 202 is mainly used to serve the UE 1 in the RRC inactive state. Therefore, as shown in FIG. 5, the BS 2a may actively generate and transmit the BS group notification message 202 to the UE 1 in some particular conditions, e.g., (1) after the BSs 2a, 2b and 2c provide dual connectivity service based on the pre-configuration when the UE 1 is in the RRC connected state; (2) after the BSs 2a, 2b and 2c provide dual connectivity service according to the loading of the radio resources of the BS 2a itself and the BSs 2b and 2c when the UE 1 is in the RRC connected state; or (3) when the UE 1 is in the RRC connected state and the BS 2a decides to command the UE 1 to transit from the RRC connected state to the RRC inactive state. Moreover, the BS group indicated by the BS group notification message 202 may be the same as or different from the BS group that provides the dual connectivity service when the UE 1 is in the RRC connected state.

On the other hand, as shown in FIG. 6, the BS 2 may also set up a BS group according to a request from the UE 1, and transmit the access stratum context of the UE 1 to the BSs 2b and 2c. In detail, the UE 1 may generate and transmit a BS group setup request message 100 to the BS 2 in some situations, e.g., (1) in an attach procedure, the BS group setup request message 100 is carried in an attach request message or an RRC connection request message; (2) in the RRC connected state, when the dual connectivity service is required to be provided; or (3) in the RRC connected state, when it is required to transit to the RRC inactive state. Accordingly, after receiving the BS group setup request message 100, the BS 2 may set up a BS group and transmit a BS group notification message 202 according to the BS group setup request message 100. Moreover, after setting up the BS group, the BS 2a may associate the specific preamble 102 with the BS group and allocate the preamble 102 to the UE 1 for subsequent signal transmission in the RRC inactive state.

Figure 7A:
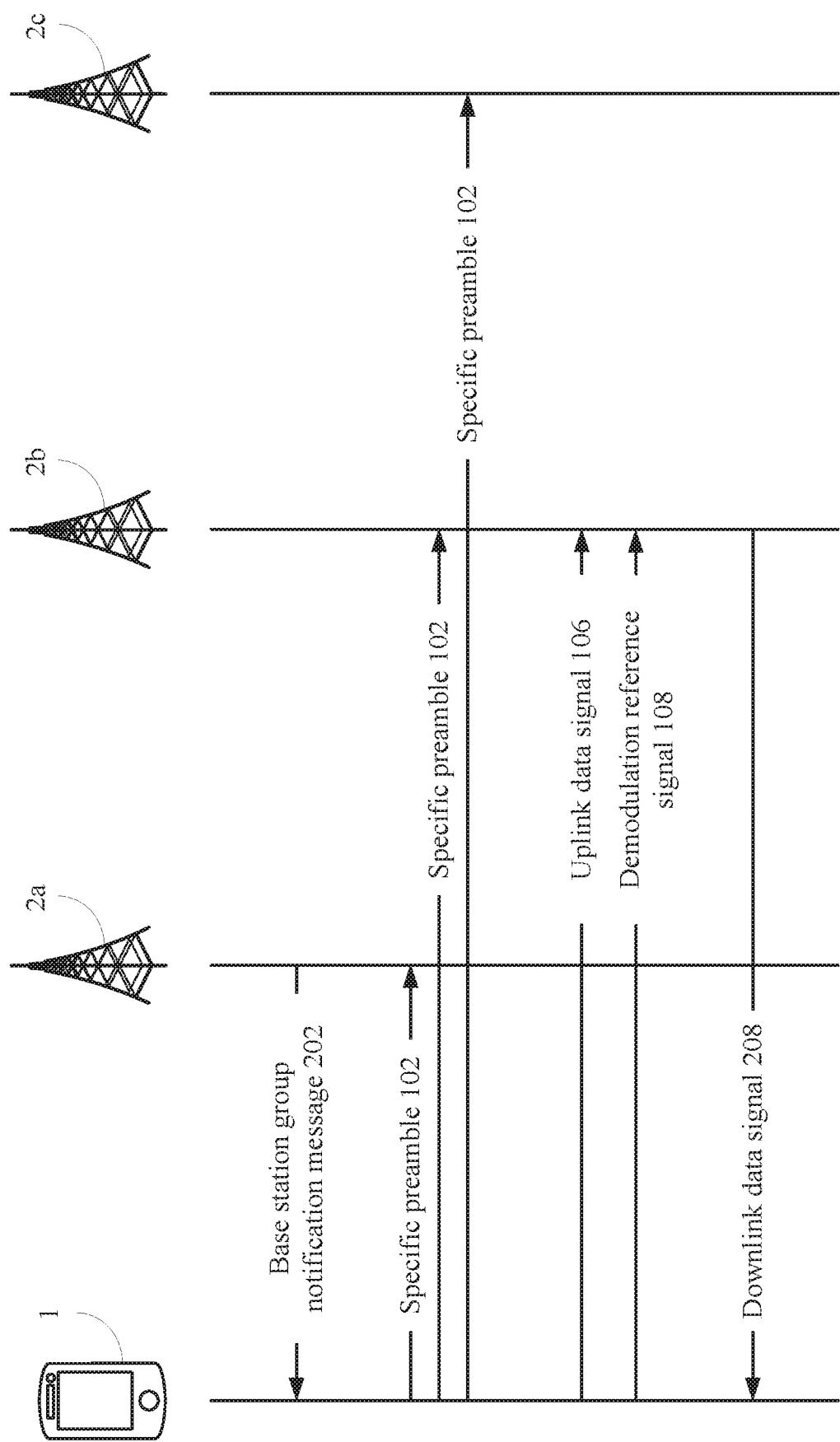
FIG. 7A to FIG. 7B depict implementation scenarios of signal transmission between the UE 1 and BSs 2a, 2b and 2c according to the present invention.
Figure 7B:
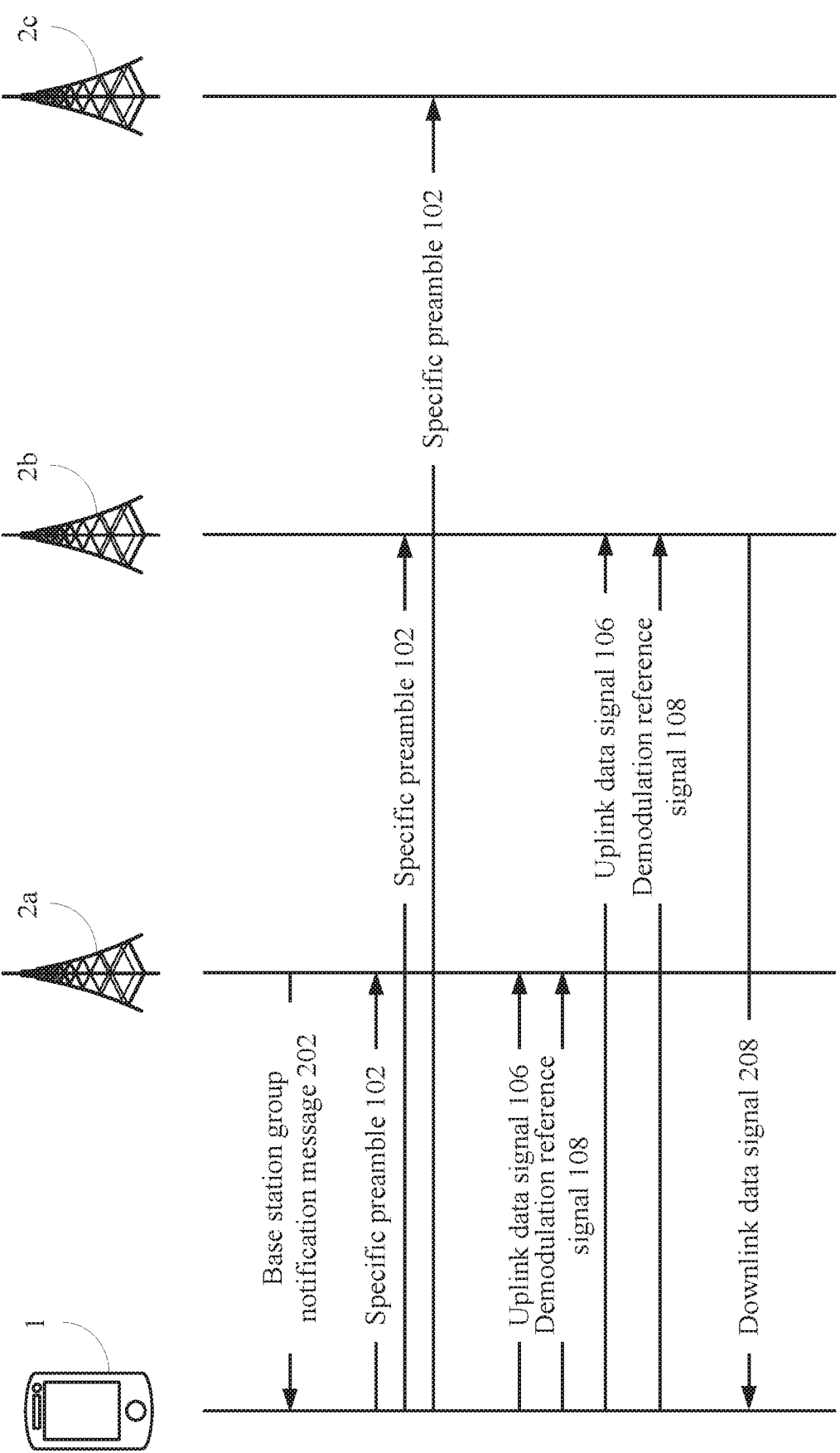

A fifth embodiment of the present invention is as shown in FIG. 7A to FIG. 7B. The fifth embodiment is an extension of the fourth embodiment, and it illustrates a data transmission scenario after the UE 1 receives the BS group notification message 202 and transits from the RRC connected state to the RRC inactive state.

In the implementation scenarios shown in FIG. 7A and FIG. 7B, the specific preamble 102 has a correspondence relationship with the uplink transmission radio resource and the downlink transmission radio resource. When the UE 1 is in the RRC inactive state and needs to transmit the uplink data signal 106, in addition to transmitting the specific preamble 102 to the BS 2a on a random access channel of the BS 2a, the UE 1 may further transmit the specific preamble 102 to at least one other BS on at least one other random access channel of at least one other BS (e.g., the BSs 2b and 2c). In other words, the BS group notification message 202 indicates that the BS group comprises the BSs 2a, 2b and 2c, so the UE 1 directly transmits the specific preamble 102 to the BSs 2a, 2b and 2c in the BS group when the UE 1 needs to transmit the uplink data signal 106.

After transmitting the specific preamble 102, the UE 1 directly transmits the uplink data signal 106 and the demodulation reference signal 108 on the uplink transmission radio resources pre-configured by the BSs 2a, 2b and 2c. As aforementioned, the pre-configured radio resources of the BSs 2a, 2b and 2c may be semi-persistent scheduling (SPS) resources to be used by multiple UEs for uplink data signal transmission in the uplink grant-free condition. Each of the pre-configured radio resources is configured periodically from radio resources that can be utilized by the BS 2a, 2b and 2c, respectively.

Thereafter, if the BSs 2a, 2b and 2c need to transmit the downlink data signal 208 to the UE 1, each of the BSs 2a, 2b and 2c transmits the downlink data signal 208 on the downlink transmission radio resource corresponding to the specific preamble 102. For example, the BS 2b transmits the downlink data signal 208 to the UE 1 on the downlink transmission radio resource corresponding to the specific preamble 102, as shown in FIG. 7A. In this case, the UE 1 also monitors whether there is a signal on the downlink transmission radio resource according to the specific preamble 102 (i.e., according to the correspondence relationship) so as to receive the downlink data signal 208 on the downlink transmission radio resource.

Additionally, in order to increase the diversity and improve the reliability of the transmission, the UE 1 may also transmit the uplink data signal 106 and the demodulation reference signal 108 to multiple BSs. As shown in FIG. 7B, in addition to the UE 1 transmits the uplink data signal 106 and the demodulation reference signal 108 not only to the BS 2b but also to a secondary BS (e.g., the BS 2a). In other implementations, the UE 1 transmits the uplink data signal 106 and the demodulation reference signal 108 to all secondary BSs (i.e., the BSs 2a and 2c).

Figure 8A:
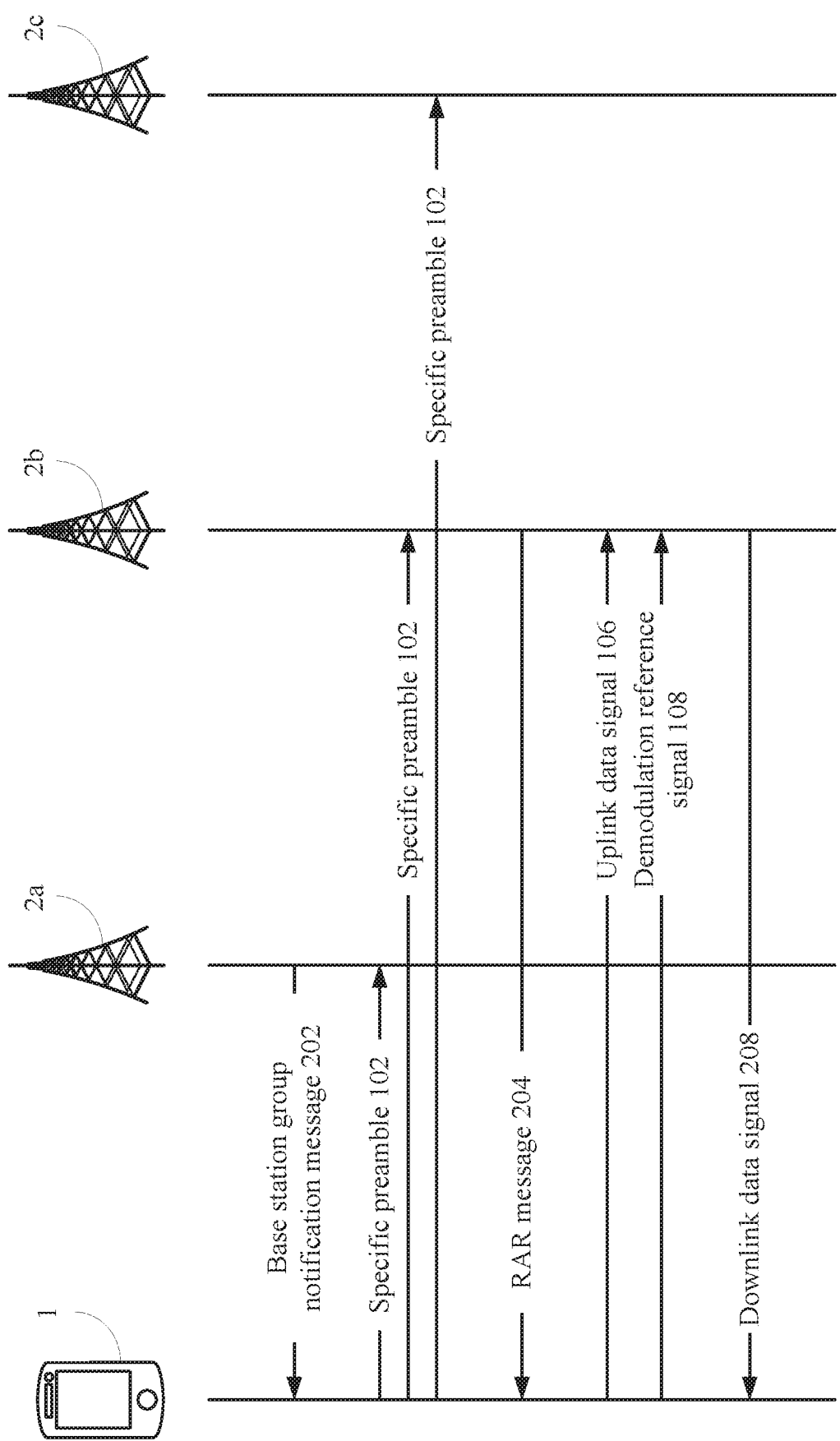
FIG. 8A to FIG. 8C depict implementation scenarios of signal transmission between the UE 1 and the BSs 2*a*, 2*b* and 2*c* according to the present invention.
Figure 8B:
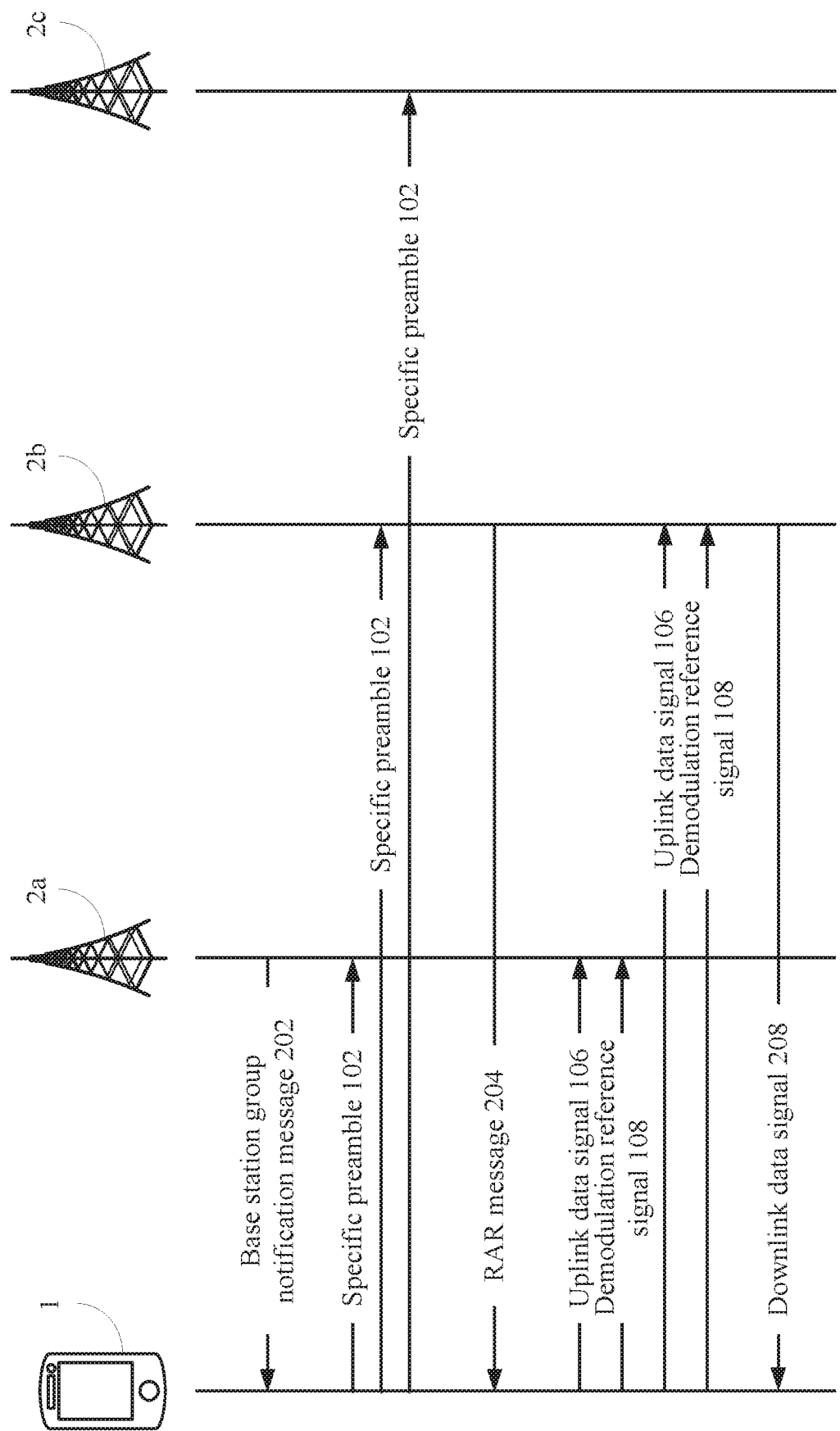
Figure 8C:
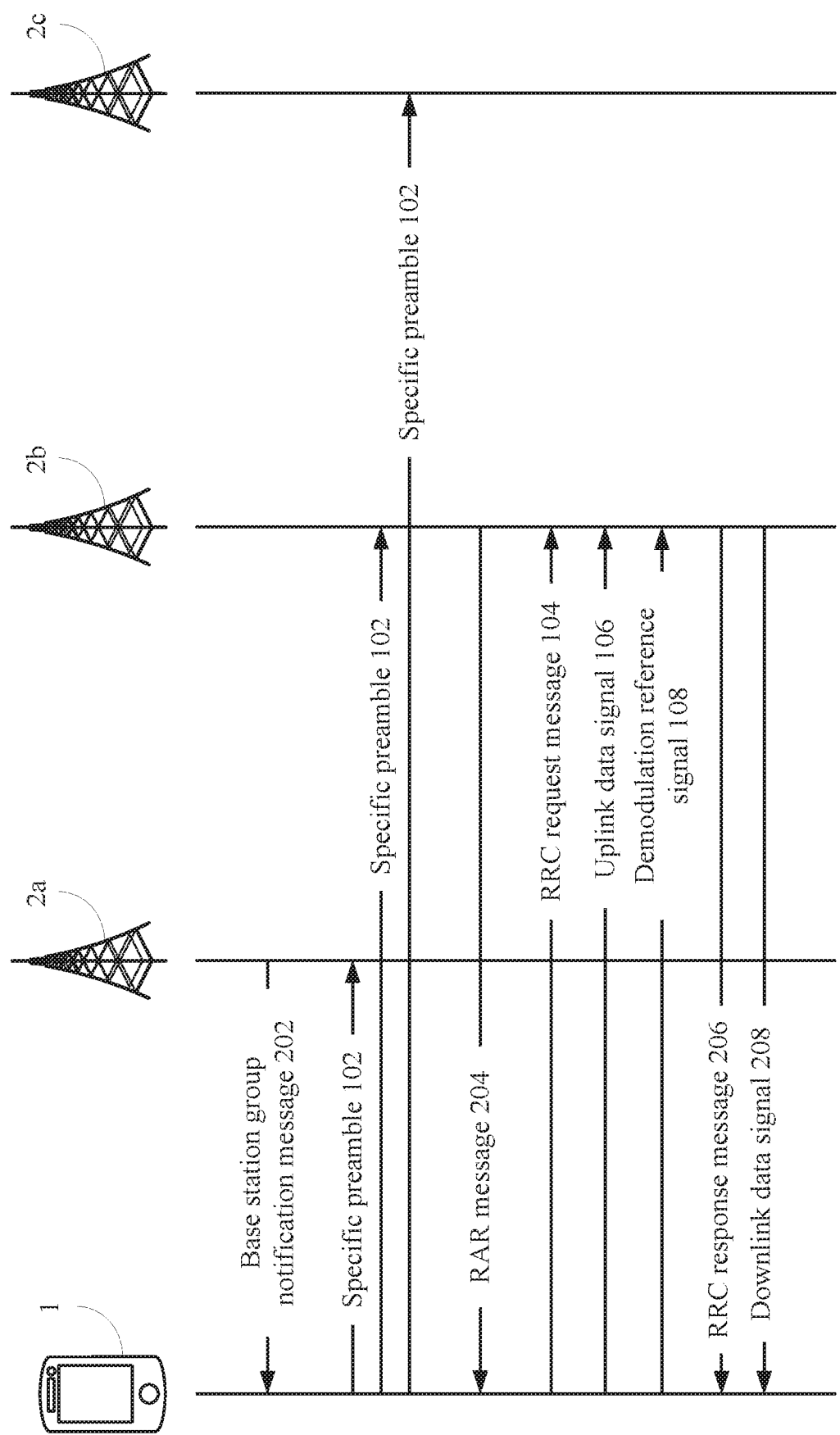

A sixth embodiment of the present invention is as shown in FIG. 8A to FIG. 8C. The sixth embodiment is also an extension of the fourth embodiment, and it illustrates a data transmission scenario after the UE 1 receives the BS group notification message 202 and transits from the RRC connected state to the RRC inactive state. Different from the implementation scenarios of FIG. 7A and FIG. 7B, in the implementation scenarios of FIG. 8A and FIG. 8B, the correspondence relationship between the uplink and downlink transmission radio resources and the specific preamble 102 is generated in response to that the BSs 2a, 2b and 2c receive the specific preamble 102 and then configure the uplink transmission radio resource and the downlink transmission radio resource to the UE 1.

Specifically, after receiving the specific preamble 102, the BS 2a, 2b and 2c can learn that the UE 1 needs to transmit the uplink data signal 106. Thereafter, the BSs 2a, 2b and 2c negotiate with each other (e.g., via an X2 transmission interface, an Xn transmission interface) to decide a representative BS. For example, the representative BS may be one of the BSs 2a, 2b and 2c which has the largest received signal strength (RSS) of the specific preamble 102 or the lowest resource utilization ratio. It is assumed that the BS 2b is the representative BS in this embodiment.

After deciding the representative BS 2b, the BSs 2a and 2c will respectively transmit the uplink transmission radio resource information and a random access preamble identifier to be allocated to the UE 1 to the representative BS 2b, and only the representative BS 2b transmits the random access response (RAR) message 204 to the UE 1, and the BSs 2a and 2c do not need to transmit the random access response message to the UE 1, as shown in FIG. 8A. It shall be appreciated that, if the random access channels (RACHs) of the BSs 2a, 2b and 2c are the same, then the random access preamble identifiers of the BSs 2a, 2b and 2c are also the same.

In this way, the RAR message 204 transmitted by the BS 2b carries the uplink transmission radio resource information, at least one piece of other uplink transmission radio resource information (i.e., the uplink transmission radio resource information generated by the BSs 2a and 2c), a random access preamble identifier, at least one other random access preamble identifier (i.e., the random access preamble identifiers assigned by the BSs 2a and 2c) and master-secondary BS identification information. The master-secondary BS identification information is used to indicate that the BS 2b is the master BS (i.e., the representative BS) and the BSs 2a and 2c are secondary BSs. Therefore, after receiving the RAR message 204, the UE 1 may transmit the uplink data signal 106 and the demodulation reference signal 108 to the master BS (i.e., the BS 2b) on the uplink transmission radio resource.

Additionally, when the BS 2b needs to transmit the downlink data signal 208 to the UE 1, the random access response message 204 may also carry the downlink transmission radio resource information. Similarly, the downlink transmission radio resource information may directly indicate the downlink transmission radio resource to inform the UE 1 of the position of the downlink transmission radio resource for receiving the downlink data signal 208 so that the UE 1 can learn where to retrieve the downlink data signal 208. Moreover, in other embodiments, the BS 2 may also carry information for retrieving DCI from a search space on a physical downlink control channel (e.g., a temporary UE identifier (ID)) in the random access response message 204 according to the specific preamble 102, and transmit the DCI on the physical downlink control channel to enable the UE 1 to retrieve the DCI in the corresponding search space and thereby learn the downlink transmission radio resource. Additionally, in other embodiments, the downlink transmission radio resource may be learned according to the correspondence relationship with the specific preamble 102, as described in the first embodiment. In other words, the uplink transmission radio resource information is learned from the random access response message 204, while the downlink transmission radio resource information is implied by the specific preamble 102.

Thereafter, the UE 1 may receive the downlink data signal 208 on the downlink transmission radio resource. Moreover, in order to increase the diversity and improve the reliability of the transmission, the UE 1 may also transmit the uplink data signal 106 and the demodulation reference signal 108 to multiple BSs. As shown in FIG. 8B, in addition to transmitting the uplink data signal 106 and the demodulation reference signal 108 to the BS 2b by the UE 1, the UE 1 may also transmit the uplink data signal 106 and the demodulation reference signal 108 to a secondary BS (e.g., the BS 2a). In other implementations, the UE 1 transmits the uplink data signal 106 and the demodulation reference signal 108 to all secondary BSs (i.e., the BSs 2a and 2c).

It shall be appreciated that, in this embodiment, FIG. 8A to FIG. 8C only depicts that the representative BS 2b transmits the RAR message 204. However, as shall be appreciated by those of ordinary skill in the art, in other embodiments, the BSs 2a and 2c may also transmit the RAR message 204 to the UE 1 in order to increase the transmission diversity of the RAR message 204. Similarly, in order to increase the diversity, the UE 1 may also receive the downlink data signal 208 from the BSs 2a and 2c; or in order to increase the transmission efficiency, the UE 1 may also receive other downlink data signals from the BSs 2a and 2c. These operations shall be appreciated by those of ordinary skill in the art and thus will not be further described herein.

On the other hand, if the UE 1 intends to transit back into the RRC connected state, the UE 1 may transmit the RRC request message 104 to the BS 2b and receive the RRC response message 206 from the BS 2b (i.e., to re-establish the RRC connection with the representative BS), as shown in FIG. 8C. Moreover, in other embodiments, in addition to establishing the RRC connection with the BS 2b to return back to the RRC connected state, the UE 1 may also establish the RRC connection with the BSs 2a and 2c at the same time by transmitting the RRC request message 104 to the BSs 2a and 2c and receiving the RRC response message 206 from the BSs 2a and 2c. In this way, when the UE 1 returns back into the RRC connected state, the BSs 2a, 2b and 2c may provide the dual connectivity service.

Figure 9A:
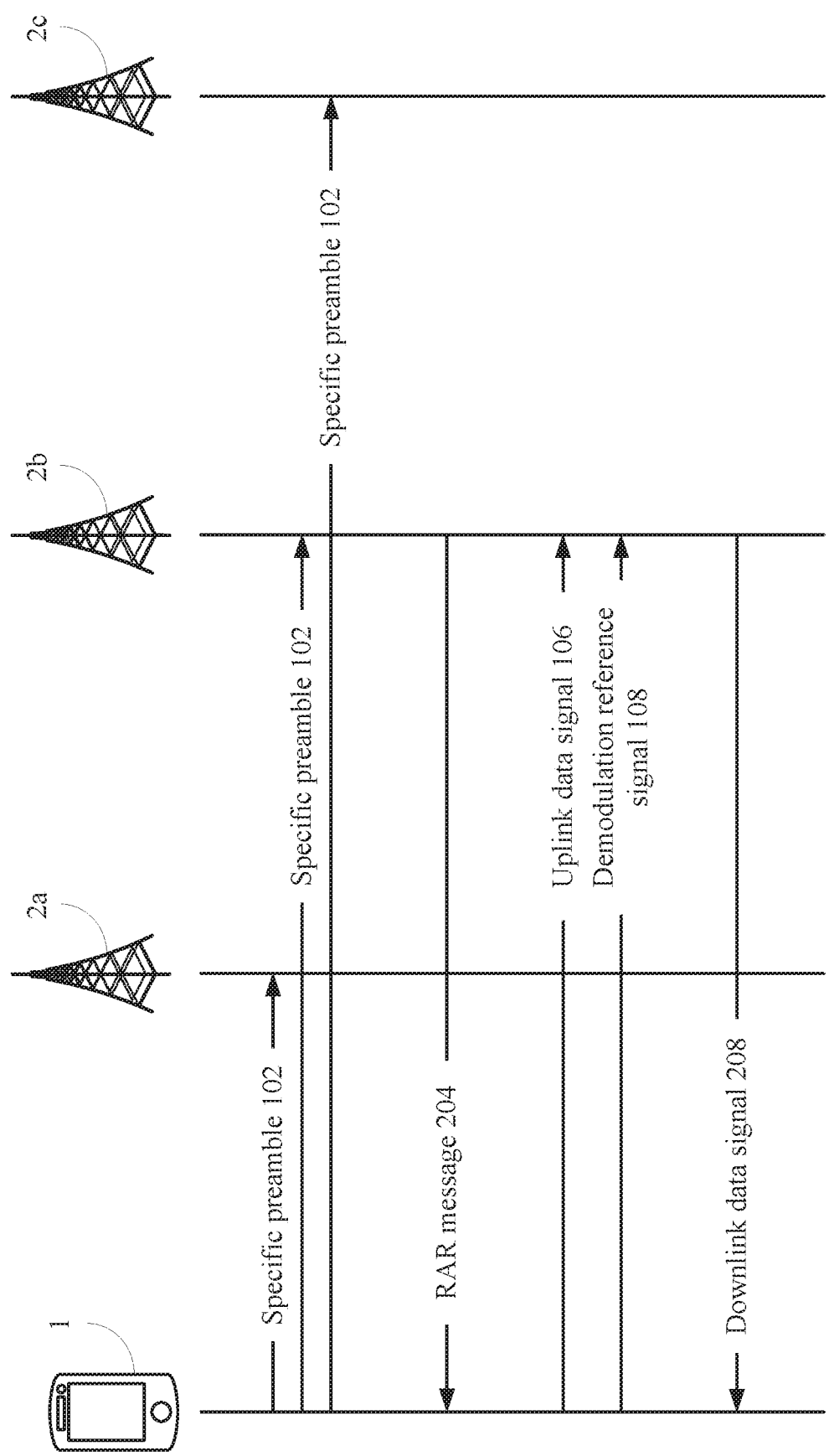
FIG. 9A to FIG. 9C depict implementation scenarios of signal transmission between the UE 1 and the BSs 2*a*, 2*b* and 2*c* according to the present invention.
Figure 9B:
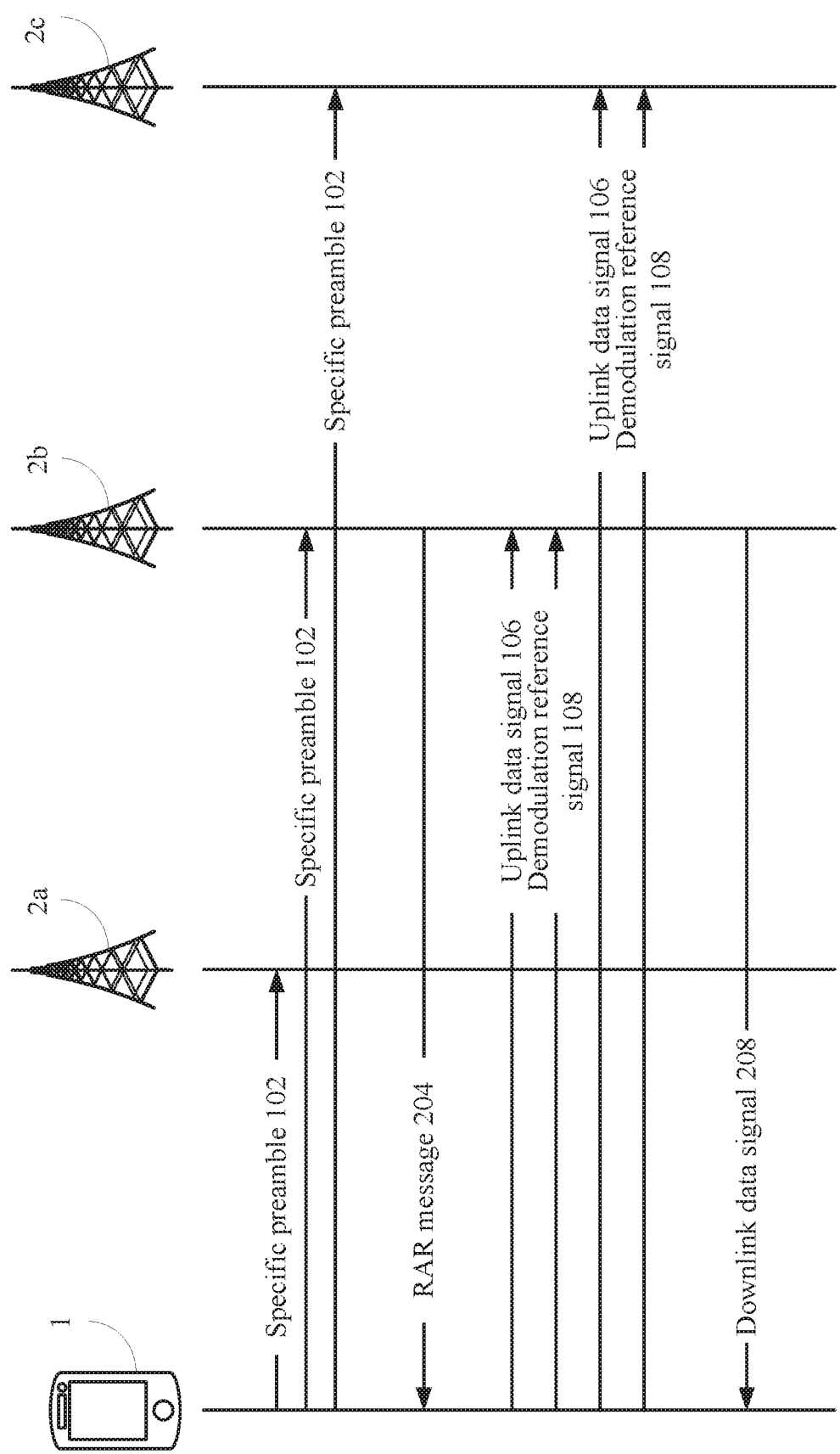
Figure 9C:
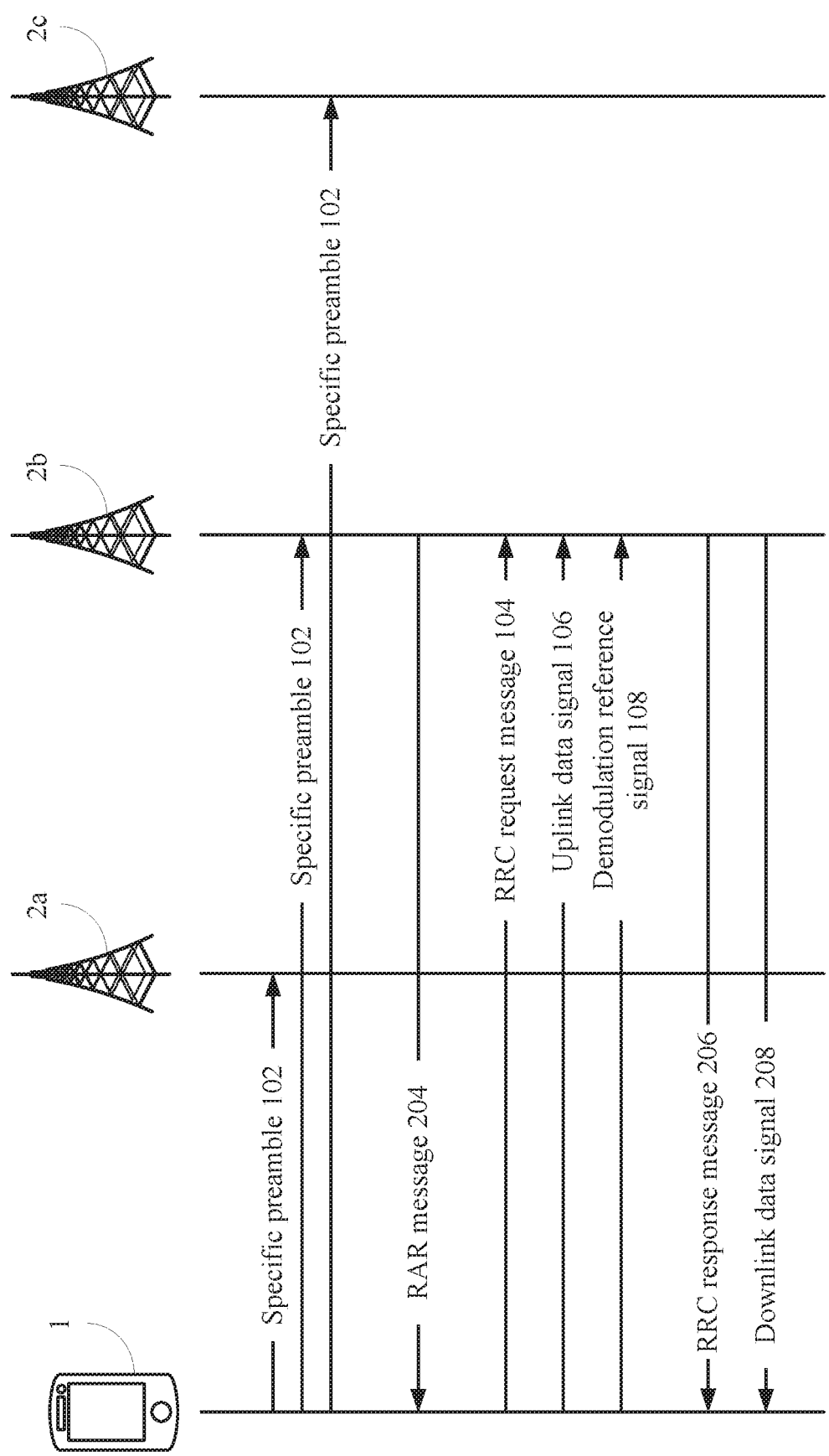

A seventh embodiment of the present invention is as shown in FIG. 9A to FIG. 9C. Different from the sixth embodiment, in this embodiment, the setup of the BS group is triggered by the operation of transmitting the specific preamble 102 by the UE 1 in the RRC inactive state. In other words, in this embodiment, the BS 2 does not set up the BS group for the UE 1 when the UE 1 is in the RRC connected state, so the UE 1 does not receive the BS group notification message 202 from the BS 2a.

Similarly, this embodiment assumes that the UE 1 is connected with the BS 2a when the UE 1 is in the RRC connected state. When the UE 1 transits to the RRC inactive state, in addition to transmitting the specific preamble 102 to the BS 2a on the random access channel, the UE 1 further transmits the specific preamble 102 to at least one other BS 2a and 2c on at least one other random access channel.

Because the UE 1 establishes the RRC connection only with the BS 2a when the UE 1 is in the RRC connected state, only the BS 2a stores the access stratum context of the UE 1 after the UE 1 transits into the RRC inactive state. After receiving the specific preamble 102, the BS 2a determines whether other surrounding BSs 2b and 2c have received the specific preamble 102, and decides which BSs form the BS group to serve the UE 1 based on information such as the system loading of other BSs 2b and 2c and the received signal strength of the specific preamble 102 received by the BSs 2b and 2c (but not limited thereto). In this embodiment, it is assumed that the BS group comprises the BSs 2a, 2b and 2c. Therefore, the BS 2a transmits the access stratum context of the UE 1 to other BSs 2b and 2c in the BS group. After the setup of the BS group, the BS 2a negotiates with the other BSs 2b and 2c to select a representative BS. Then, the representative BS transmits the RAR message 204 to the UE 1. The representative BS in FIG. 9A to FIG. 9C is the BS 2b, so the UE 1 receives the RAR message 204 from the BS 2b.

Because the BS group is not set up before the UE 1 transits to the RRC inactive state, the RAR message 204 further carries BS group information in addition to carrying the uplink transmission radio resource information, at least one piece of other uplink transmission radio resource information, a random access preamble identifier, at least one other random access preamble identifier and master-secondary BS identification information. The BS group information indicates the BS group which comprises the BSs 2a, 2b and 2c. It shall be appreciated that, in this embodiment, the BS group comprises three BSs 2a, 2b and 2c. However, in other embodiments, the BS group may only comprise two BSs (e.g., the BSs 2a and 2b) or comprise more than three BSs (all of these BSs receive the specific preamble 102 from the UE 1). Similarly, the master-secondary BS identification information is used to indicate that the BS 2b is the master BS (i.e., the representative BS) and the BSs 2a and 2c are secondary BSs. The transmission operations which are performed after the RAR message 204 is received by the UE in this embodiment are the same as that in the sixth embodiment, and thus will not be further described herein.

Figure 10A:
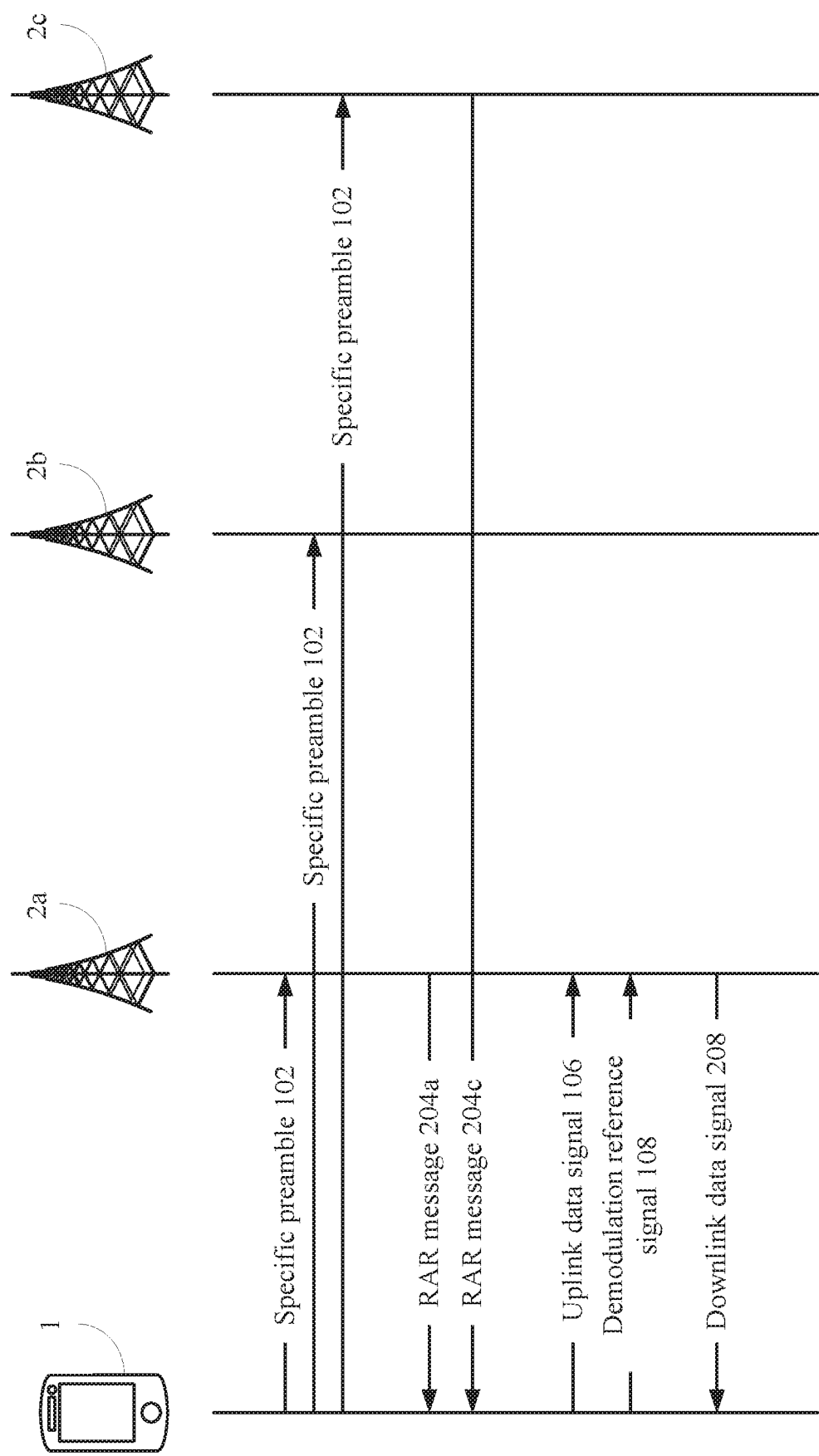
FIG. 10A to FIG. 10C depict implementation scenarios of signal transmission between the UE 1 and the BSs 2*a*, 2*b* and 2*c* according to the present invention.
Figure 10B:
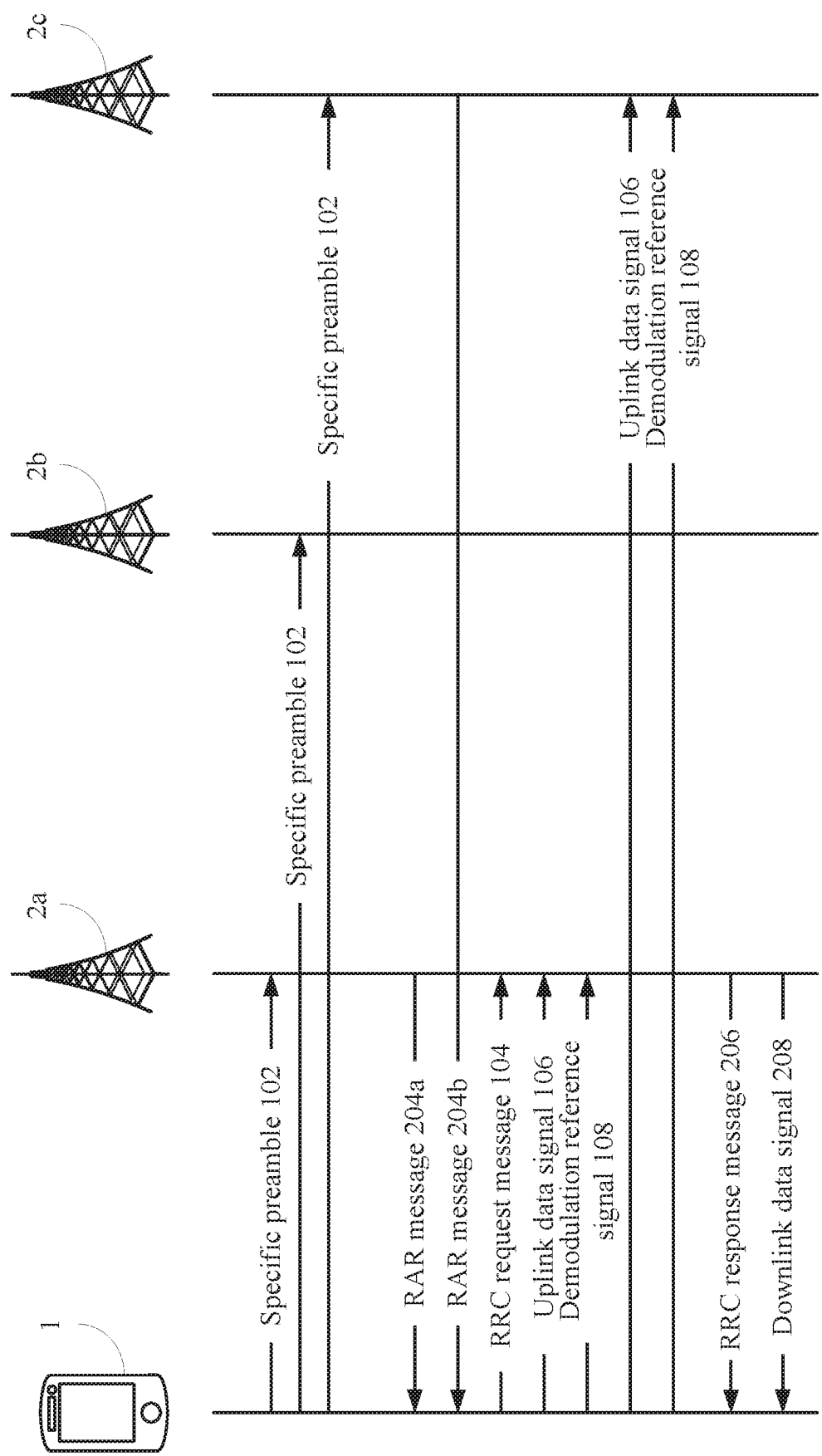
Figure 10C:
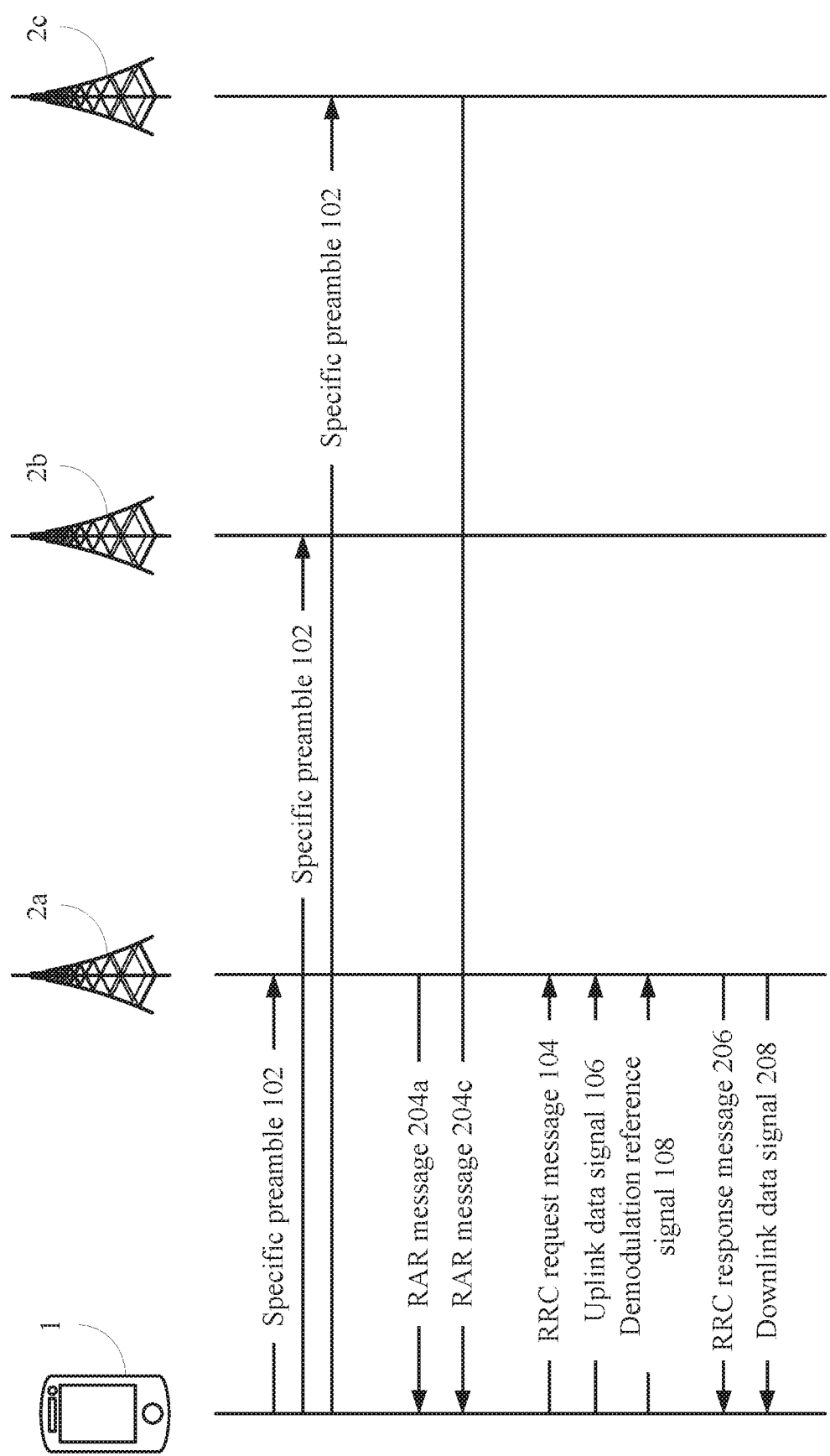

An eighth embodiment of the present invention is as shown in FIG. 10A to FIG. 10C. Similarly, after receiving the specific preamble 102, the BSs 2a, 2b and 2c negotiate with each other to decide which BSs serve the UE 1 and set up the BS group. However, this embodiment differs from the seventh embodiment in that: the BSs in the BS group are called qualified BSs, and the qualified BSs individually transmit the RAR message to the UE, i.e., the UE 1 receives the RAR message respectively from the qualified BSs.

For example, as shown in FIG. 10A, here it is assumed that the qualified BSs include the BS 2a (i.e., the BS to which the UE 1 is connected before the UE 1 transits to the RRC inactive state) and at least one of the BSs 2b and 2c (e.g., the BS 2c), so the UE 1 receives RAR messages 204a and 204c respectively from the qualified BSs 2a and 2c. Each of the RAR messages 204a and 204c carries a qualified uplink transmission radio resource, a random access preamble identifier and a piece of master-secondary BS identification information. In this embodiment, the master-secondary BS identification information in each of the RAR messages 204a and 204c is used to indicate whether the corresponding BS is the master BS or the secondary BS, i.e., the master-secondary BS identification information in the RAR message 204a indicates that the BS 2a is the master BS, and the master-secondary BS identification information in the RAR message 204c indicates that the BS 2c is the secondary BS.

In other words, the major difference between this embodiment and the seventh embodiment is that: in the seventh embodiment, the representative BS carries all information, which all the BSs in the BS group intend to transmit, in the RAR message 204 to be transmitted together, and in this embodiment, each of the qualified BSs carries its information, which it intends to transmit, in respective RAR messages 204a and 204c individually. Similarly, the UE 1 transmits the uplink data signal 106 and the demodulation reference signal 108 to the BS 2a and receives the downlink data signal 208 from the BS 2a, as shown in FIG. 10A. Moreover, in order to increase the diversity and improve the reliability of the transmission, the UE 1 may also transmit the uplink data signal 106 and the demodulation reference signal 108 to multiple BSs. As shown in FIG. 10B, in addition to transmitting the uplink data signal 106 and the demodulation reference signal 108 to the BS 2a, the UE 1 may also transmit the uplink data signal 106 and the demodulation reference signal 108 to the secondary BS (e.g., the BS 2c). In other implementations, when the BS 2b also belongs to the qualified BSs, the UE 1 may transmit the uplink data signal 106 and the demodulation reference signal 108 to all secondary BSs (i.e., the BSs 2b and 2c).

Moreover, in other embodiments, in order to increase the diversity, the UE 1 may also receive the downlink data signal 208 from the BS 2c; or in order to increase the transmission efficiency, the UE 1 may also receive other downlink data signals from the BS 2c. These operations shall be appreciated by those of ordinary skill in the art and thus will not be further described herein.

On the other hand, if the UE 1 intends to transit back into the RRC connected state, the UE 1 may transmit the RRC request message 104 to the BS 2a and receive the RRC response message 206 from the BS 2a (i.e., re-establish the RRC connection with the representative BS), as shown in FIG. 10C. Moreover, in other embodiments, in addition to establishing the RRC connection with the BS 2a to return back to the RRC connected state, the UE 1 may also establish the RRC connection with the BS 2c at the same time by transmitting the RRC request message 104 to the BS 2c and receiving the RRC response message 206 from the BS 2c. In this way, when the UE 1 returns back into the RRC connected state, the BSs 2a and 2c may provide the dual connectivity service.

Figure 11A:
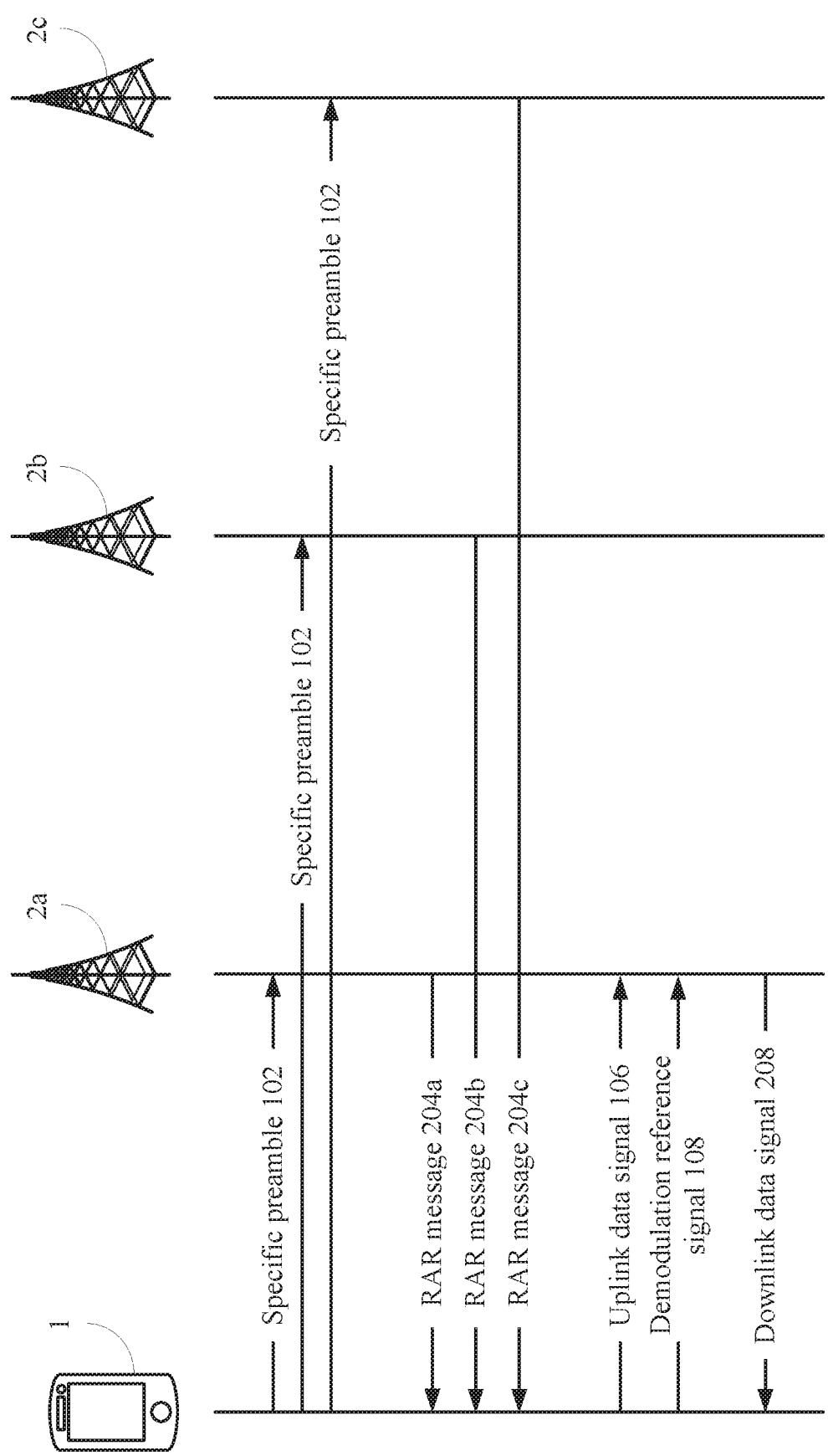
FIG. 11A to FIG. 11C depict implementation scenarios of signal transmission between the UE 1 and the BSs 2*a*, 2*b* and 2*c* according to the present invention.
Figure 11B:
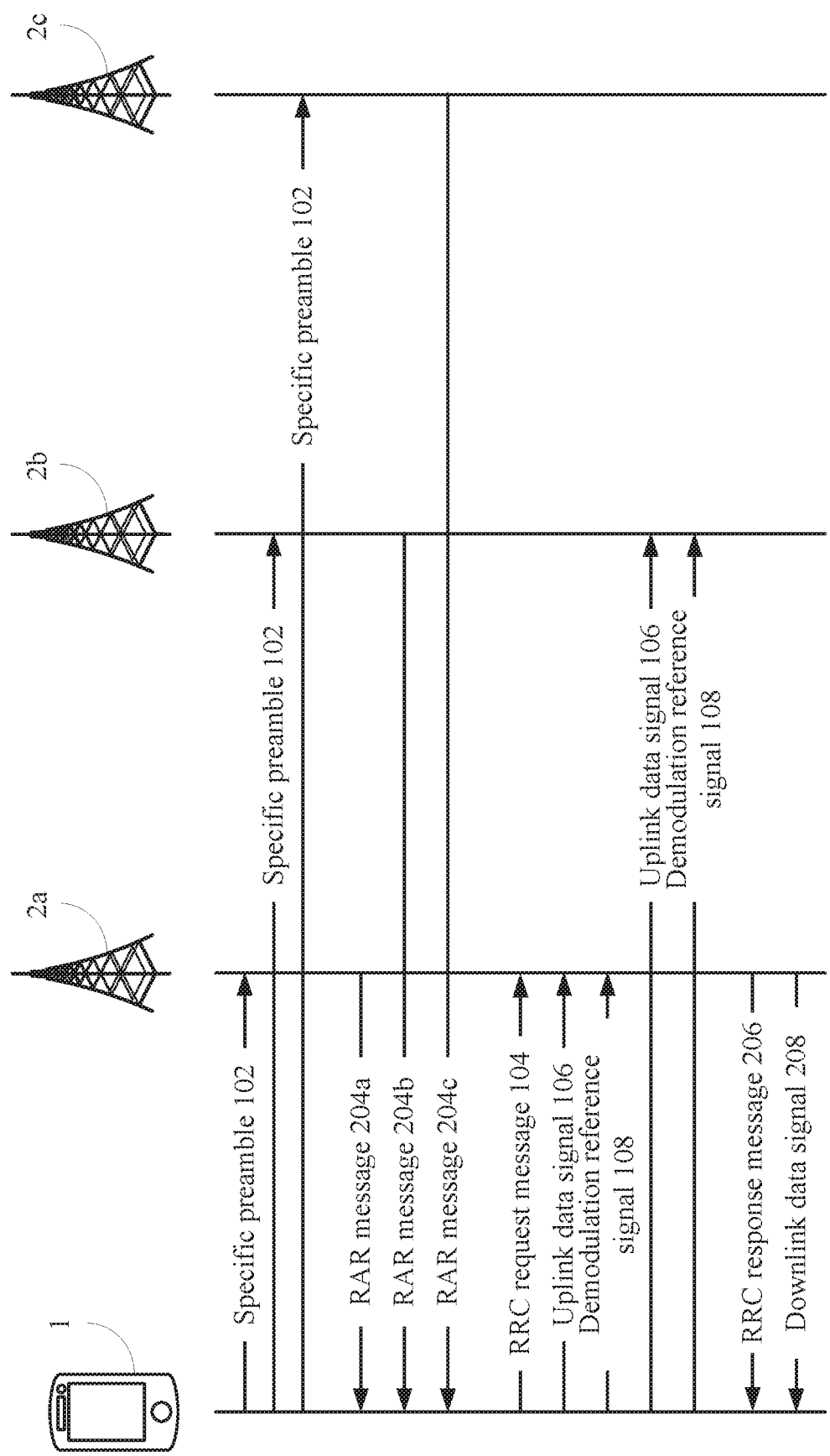
Figure 11C:
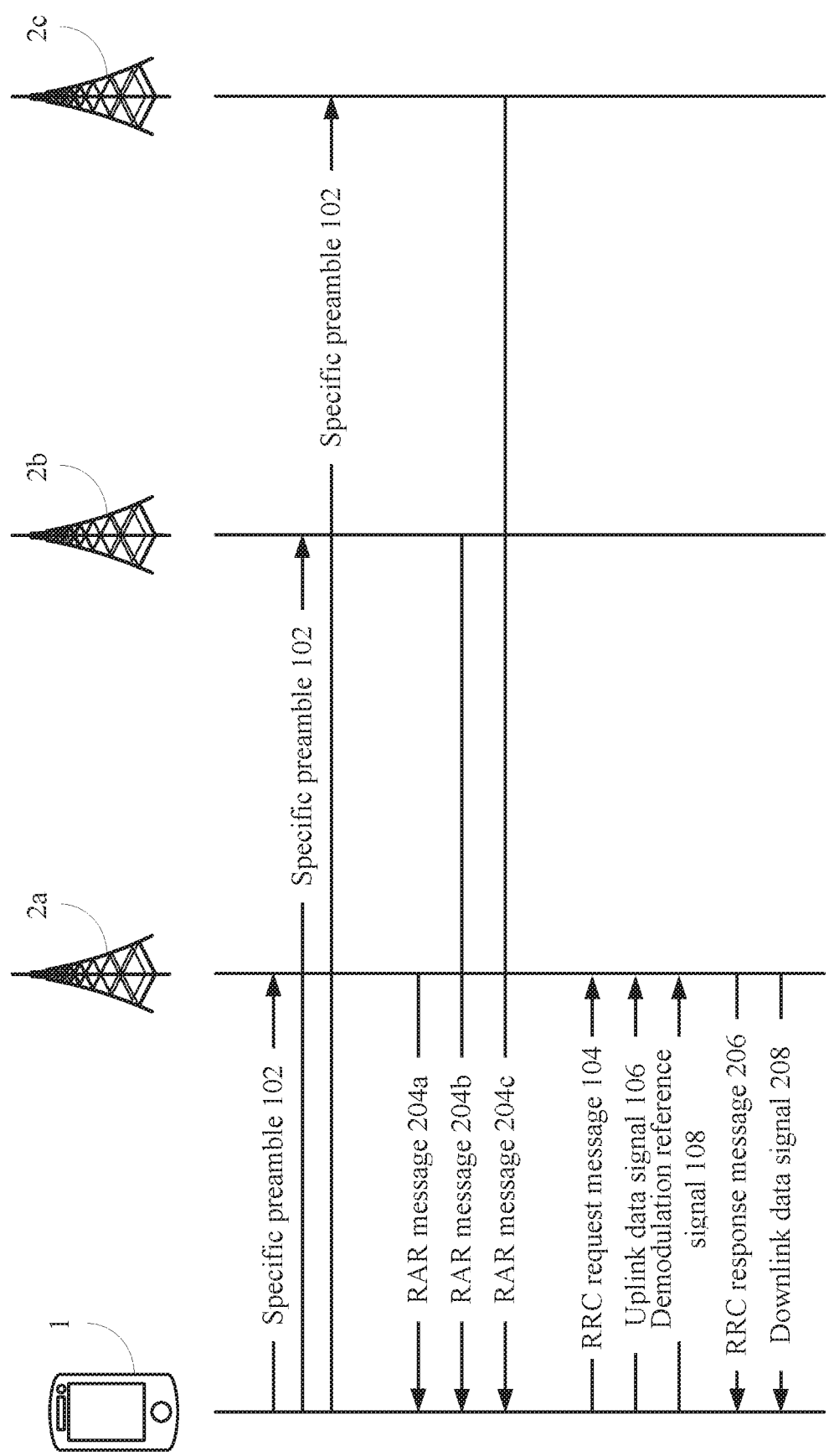

A ninth embodiment of the present invention is as shown in FIG. 11A to FIG. 11C. Similarly, in addition to transmitting the specific preamble 102 to the BS 2a on the random access channel, the UE 1 may further transmit the specific preamble 102 to at least one other BS 2b and 2c on at least one other random access channel. Different from the seventh embodiment and the eighth embodiment, in this embodiment, the BSs 2a, 2b and 2c do not negotiate with each other to set up the BS group after receiving the specific preamble 102, and instead, the UE 1 decides which BS it would like to perform transmission with. Additionally, in this embodiment, the BSs that have received the specific preamble 102 are called candidate BSs, and each of the candidate BSs independently evaluates whether to provide the data transmission service to the UE 1, and transmits the RAR message to the UE 1 after deciding to provide the transmission service to the UE 1. For example, as shown in FIG. 11A to FIG. 11C, the BSs 2a, 2b and 2c will respectively transmit the RAR message 204a, 204b and 204c to the UE 1 when they decide to provide the transmission service to the UE.

As shall be appreciated by those or ordinary skill in the art, some BSs may not receive the specific preamble 102 when the UE 1 transmits the specific preamble 102 due to poor channel quality, and in this case, the BSs that have not received the specific preamble 102 will not transmit the RAR message to the UE, and the BS that has received the specific preamble 102 may also decide not to provide the transmission service to the UE 1 because of an excessively high resource loading thereof or the like. Accordingly, here it is assumed that when the UE 1 transmits the specific preamble 102, all of the BSs 2a, 2b and 2c receive the specific preamble 102 and decide to provide the transmission service to the UE 1, so all of the BSs 2a, 2b and 2c transmit the RAR messages 204a, 204b and 204c.

Each of the RAR messages 204a, 204b and 204c indicates a candidate uplink transmission radio resource and a random access preamble identifier. Then, after receiving the RAR messages 204a, 204b and 204c, the UE 1 determines that the received signal strength of the RAR messages 204a and 204b are greater than a preset value or are the greatest two and takes the BSs 2a and 2b as a BS group. In other words, in this embodiment, the UE 1 may decide the BS group on its own according to the received signal strength of the RAR messages. Next, the UE 1 may select the BS corresponding to the greatest one among the received signal strength of the RAR messages (e.g., the BS 2a) as the master BS.

Then, the UE 1 carries the uplink data signal 106 and the demodulation reference signal 108 on the candidate uplink transmission radio resource indicated by the RAR message 204a, transmits the uplink data signal 106 and the demodulation reference signal 108 to the BS 2a, and receives the downlink data signal 208 from the BS 2a, as shown in FIG. 11A. Moreover, as shown in FIG. 11B, the UE 1 may also regard the BS 2b in the BS group as the secondary BS. In order to increase the diversity and improve the reliability of the transmission, the UE 1 may also transmit the uplink data signal 106 and the demodulation reference signal 108 to the B S 2b.

On the other hand, if the UE 1 intends to transit back into the RRC connected state, the UE 1 may transmit the RRC request message 104 to the BS 2a and receive the RRC response message 206 from the BS 2a (i.e., re-establish the RRC connection with the representative BS), as shown in FIG. 11C. Moreover, in other embodiments, in addition to establishing the RRC connection with the BS 2a to return back to the RRC connected state, the UE 1 may also establish the RRC connection with the BS 2b at the same time by transmitting the RRC request message 104 to the BS 2b and receiving the RRC response message 206 from the BS 2b. In this way, when the UE 1 returns back into the RRC connected state, the BSs 2a and 2b may provide the dual connectivity service.

Figure 12:
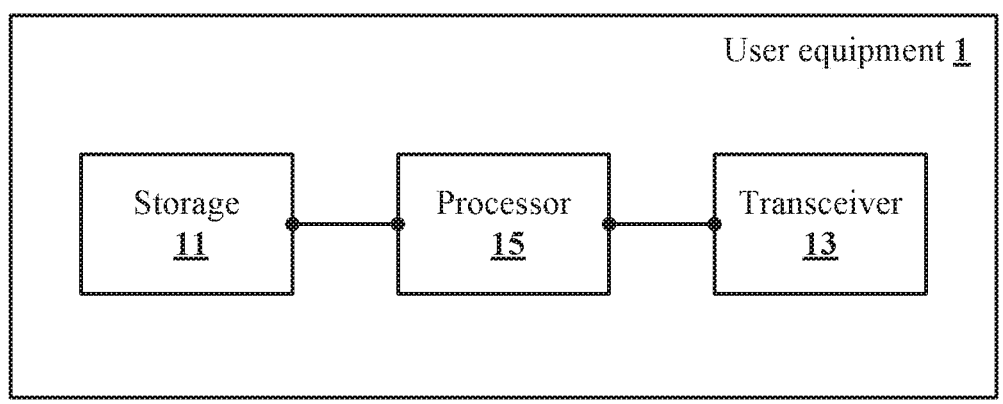
FIG. 12 is a schematic view of the UE 1 according to the present invention.

A tenth embodiment of the present invention is as shown in FIG. 12, which is a schematic view of the UE 1 of the present invention. The UE 1 comprises a storage 11, a transceiver 13 and a processor 15. The processor 15 is electrically connected to the storage 11 and the transceiver 13. In the implementation scenario as shown in FIG. 2, the processor 15 transmits the specific preamble 102 on a random access channel (RACH) and transmits the uplink data signal 106 and the demodulation reference signal (DMRS) 108 on an uplink transmission radio resource via the transceiver 13 to make the BS 2 receives the uplink data signal 106 and the demodulation reference signal 108 according to the specific preamble 102 after receiving the specific preamble 102. The specific preamble 102 is configured by the BS 2. The processor 15 receives the downlink data signal 208 on a downlink transmission radio resource via the transceiver 13 according to the specific preamble 102.

As described in the first embodiment, in order to enable the UE 1 to transmit the uplink data to the BS 2 rapidly and in real time, the uplink transmission radio resource is pre-configured by the BS 2, and the specific preamble 102 has a correspondence relationship with the uplink transmission radio resource and the downlink transmission radio resource. Therefore, the BS 2 may receive the uplink data signal 106 directly on the uplink transmission radio resource the transceiver 13 according to the correspondence relationship after receiving the specific preamble 102, and receive the downlink data signal 208 on the downlink transmission radio resource the transceiver 13 according to the correspondence relationship.

In an embodiment (in the implementation scenario as shown in FIG. 3B), the processor 15 further receives the RAR message 204 from the BS 2 via the transceiver 13. The RAR message 204 is generated by the BS 2 according to the specific preamble 102 and carries uplink transmission radio resource information and downlink transmission radio resource information. The processor 15 further transmits the RRC request message 104 to the BS 2 on the uplink transmission radio resource according to the uplink transmission radio resource information via the transceiver 13, and receives the RRC response message 206 from the BS 2 on the downlink transmission radio resource according to the downlink transmission radio resource information via the transceiver 13.

Moreover, in an embodiment (in the implementation scenario as shown in FIG. 4), the processor 15 may receive a paging message 200 via the transceiver 13 when the UE 1 is not in the RRC connected state. The paging message 200 indicates the specific preamble 102. The specific preamble 102 has a correspondence relationship with the uplink transmission radio resource and the downlink transmission radio resource to make the processor 15 receive another downlink data signal 210 on the downlink transmission radio resource the transceiver 13 according to the paging message 200.

In an embodiment (in the implementation scenario as shown in FIG. 5), the processor 15 further receives the BS group notification message 202 from the BS 2a via the transceiver 13. The BS group notification message 202 indicates a BS group, and the BS group comprises the BS 2a and at least one other BS 2b and 2c. Moreover, in an embodiment (in the implementation scenario as shown in FIG. 6), the processor 15 transmits a BS group setup request message 100 to the BS 2a via the transceiver 13 to make the BS 2a set up the BS group according to the BS group setup request message 100 and transmits the BS group notification message 202 to the UE 1. In other words, the setup of the BS group is triggered after the UE 1 transmits the BS group setup request message 100. Additionally, as described in the fourth embodiment, the processor 15 may transmit the BS group setup request message 100 to the BS 2a and receive the BS group notification message 202 from the BS 2a during a process in which UE 1 transits from an RRC idle state into an RRC connected state, or when the UE 1 is in an RRC connected state.

In an embodiment (in the implementation scenarios as shown in FIG. 8A to FIG. 8C), the processor 15 further transmits the specific preamble to the at least one other BS 2b and 2c on at least one other random access channel via the transceiver 13, and receives an random access response (RAR) message 204 from a representative BS (i.e., the BS 2b) in the BS group via the transceiver 13. As described in the sixth embodiment, the BSs 2a, 2b and 2c that have received the specific preamble 102 in the BS group will negotiate with each other to decide one representative BS and the representative BS transmits the RAR message 204. The RAR message 204 carries the uplink transmission radio resource information, at least one piece of other uplink transmission radio resource information, a random access preamble identifier, at least one other random access preamble identifier and master-secondary BS identification information.

Moreover, in other embodiments (in the implementation scenario as shown in FIG. 8C), the processor 15 further transmits the RRC request message 104 to the representative BS (i.e., the BS 2b) via the transceiver 13. The RRC request message 104 carries an access stratum context identifier. The processor 15 receives an RRC response message from the BS via the transceiver 13.

In an embodiment (in the implementation scenarios as shown in FIG. 9A to FIG. 9C), the processor 15 further transmits the specific preamble 102 to the at least one other BS 2b and 2c on at least one other random access channel via the transceiver 13. As described in the seventh embodiment, the BS group is set up after the UE transits to the RRC inactive state. The processor 15 further receives the RAR message 204 from a representative BS (i.e., the BS 2b) of a BS group via the transceiver 13. The RAR message 204 carries the uplink transmission radio resource information, at least one piece of other uplink transmission radio resource information, a random access preamble identifier, at least one other random access preamble identifier, BS group information and master-secondary BS identification information. The BS group information indicates the BS group. The BS group comprises the BS 2b and at least one of the at least one other BS (e.g., the BSs 2a and 2c).

In an embodiment (in the implementation scenarios as shown in FIG. 10A to FIG. 10C), the processor 15 further transmits the specific preamble 102 to the at least one other BS 2b and 2c on at least one other random access channel via the transceiver 13. As described in the eighth embodiment, the BSs that have received the specific preamble 102 will negotiate with each other to decide which BSs are the qualified BSs and the decided qualified BSs transmit the RAR message. Here it is assumed that the qualified BSs include the BS 2a and at least one of the at least one other BS (e.g., the BS 2c). The processor 15 receives RAR messages 204a and 204c respectively from a plurality of qualified BSs (i.e., the BSs 2a and 2c) in a BS group via the transceiver 13. Each of the RAR messages 204a and 204c carries a qualified uplink transmission radio resource, a random access preamble identifier and master-secondary BS identification information.

Furthermore, in an embodiment (in the implementation scenarios as shown in FIG. 11A to FIG. 11C), the processor 15 further transmits the specific preamble 102 to the at least one other BS 2b and 2c on at least one other random access channel via the transceiver 13. The processor 15 receives an RAR message from each of a plurality of candidate BSs respectively via the transceiver 13. The candidate BSs include the BS 2a and at least one of the at least one other BSs 2b and 2c. Here it is assumed that the candidate BSs include the BSs 2a, 2b and 2c, so the RAR messages 204a, 204b and 204 are received respectively from the BSs 2a, 2b and 2c. Each of the RAR messages 204a, 204b and 204 indicates a candidate uplink transmission radio resource and a random access preamble identifier. The candidate uplink transmission radio resources include the uplink transmission radio resource. The processor 15 selects at least two of the candidate BSs as a BS group. The processor 15 transmits the uplink data signal on at least one of the candidate uplink transmission radio resources corresponding to the BS group via the transceiver 13. Here, the BS group comprises the BSs 2a and 2b. It shall be appreciated that, in the aforesaid embodiments, the UE 1 may be in the RRC inactive state.

Figure 13:
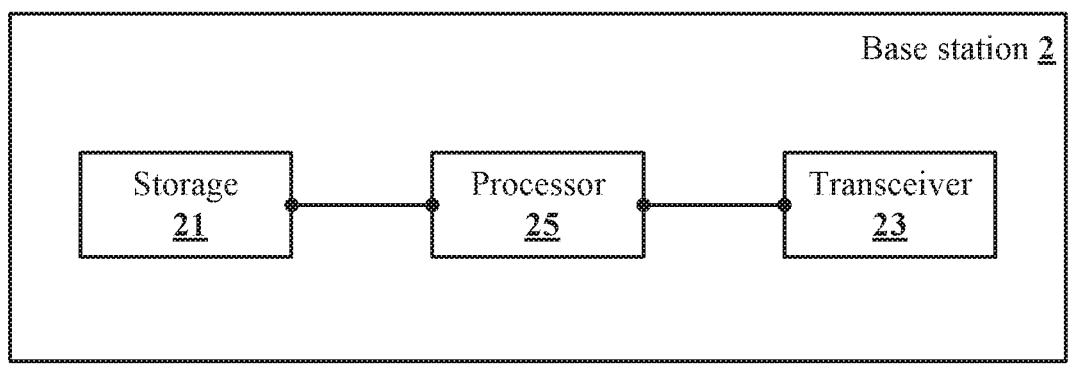
FIG. 13 is a schematic view of the BS 2 according to the present invention.

An eleventh embodiment of the present invention is as shown in FIG. 13, which is a schematic view of the BS 2 according to the present invention. The BS 2 comprises a storage 21, a transceiver 23 and a processor 25. The processor 25 is electrically connected to the storage 21 and the transceiver 23. In the implementation scenario as shown in FIG. 1, the processor 25 receives the specific preamble 102 on a random access channel (RACH) via the transceiver 23. The specific preamble 102 is configured by the BS 2 for the UE 1, and the specific preamble 102 has a correspondence relationship with the uplink transmission radio resource and the downlink transmission radio resource. Therefore, after receiving the specific preamble, the processor 25 receives the uplink data signal 106 and the demodulation reference signal (DMRS) 108 on an uplink transmission radio resource according to the specific preamble 102. Next, the processor 25 transmits the downlink data signal 208 on the downlink transmission radio resource via the transceiver 23 according to the specific preamble 102.

In an embodiment (in the implementation scenario as shown in FIG. 6), when the BS 2 is the BS 2a, the processor 25 receives the BS group setup request message 100 and transmits the BS group notification message 202 to the UE 1 based on the BS group setup request message 100 during a process in which the UE 1 transits from an RRC idle state into an RRC connected state or when the UE is in the RRC connected state. The BS group notification message 202 indicates a BS group, and the BS group comprises the BS 2a and at least one other BS (e.g., the BSs 2b and 2c).

In an embodiment (in the implementation scenario as shown in FIG. 8A to FIG. 8C), when the BS 2 is the BS 2b, the processor 25 further transmits a random access response (RAR) message 204 to the UE 1 via the transceiver 23 after receiving the specific preamble 102. The RAR message 204 carries uplink transmission radio resource information, at least one piece of other uplink transmission radio resource information, a random access preamble identifier, at least one other random access preamble identifier and master-secondary BS identification information. The uplink transmission radio resource information indicates the uplink transmission radio resource. Similar to the sixth embodiment, all the BSs that have received the specific preamble will negotiate with each other to decide a representative BS, and here it is assumed that the BS 2 is the BS 2b (i.e., the representative BS) in the sixth embodiment.

Additionally, in an embodiment (in the implementation scenarios as shown in FIG. 9A to FIG. 9C), when the BS 2 is the BS 2b, the processor 25 further receives configuration information from at least one other BS (i.e., the BSs 2a and 2c) via the transceiver 13 after receiving the specific preamble. The configuration information is generated by the at least one other BS in response to the specific preamble 102 being received on at least one other random access channel. The configuration information carries at least one piece of other uplink transmission radio resource information and at least one other random access preamble identifier. The specific preamble 102 is used to request setup of a BS group. The BS group comprises the BS 2b and the at least one other BS (i.e., the BSs 2a and 2c). Thereafter, the processor 25 further transmits the RAR message 204 to the UE 1 via the transceiver 23, and the RAR message 204 carries the uplink transmission radio resource information, at least one piece of other uplink transmission radio resource information, a random access preamble identifier, at least one other random access preamble identifier, master-secondary BS identification information, and BS group information. The BS group information indicates the BS group.

In an embodiment (in the implementation scenarios as shown in FIG. 10A to FIG. 10C), when the BS 2 is the BS 2a of the eighth embodiment, the BS 2a further transmits an access stratum context of the UE to at least one other BS (e.g., the BS 2c). Because the UE is connected with the BS 2a when the UE is in the RRC connected state, only the BS 2a stores the access stratum context of the UE 1 after the UE 1 transits to the RRC inactive state. After receiving the specific preamble, the BS 2a determines whether other surrounding BSs (e.g., the BSs 2b and 2c) have received the specific preamble, and negotiates with other BSs to decide the BS group and the representative BS. Thereafter, the processor 25 further transmits the RAR message 204a to the UE 1. The RAR message 204a carries uplink transmission radio resource information, a random access preamble identifier and master-secondary BS identification information. The uplink transmission radio resource information indicates the uplink transmission radio resource.

In an embodiment (e.g., in the implementation scenario described in the eighth embodiment), when the BS 2 is the BS 2c of the eighth embodiment, the processor 25 further receives an access stratum context of the UE from another BS (i.e., the BS 2a). Thereafter, the processor 25 further transmits the RAR message 204c to the UE 1. The RAR message 204c carries uplink transmission radio resource information, a random access preamble identifier and master-secondary BS identification information. The uplink transmission radio resource information indicates the uplink transmission radio resource.

According to the above descriptions, the transmission mechanism of the present invention may enable a UE to directly transmit an uplink data signal and a demodulation reference signal after transmitting a specific preamble when the UE is in the RRC inactive state, thereby satisfying requirements of low latency transmission. Moreover, the BS may set up a BS group on its own for the UE or set up a BS group according to the request from the UE, thereby improving the transmission reliability of the UE. Accordingly, the transmission mechanism of the present invention may enable the UE to be in the RRC inactive state to reduce the power consumption while still achieving transmission of low latency and high reliability.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE), comprising:
    a storage;

a transceiver; and a processor electrically connected to the storage and the transceiver, being configured to perform the following operations:

receiving, via the transceiver, a message indicating a specific preamble that was specified by a base station (BS) for the UE, transiting from a radio resource control (RRC) connected state with the BS into an RRC inactive state or an RRC idle state, wherein the UE corresponds to an access stratum context identifier which allows the BS to identify the UE;

transmitting, via the transceiver, the specific preamble on a random access channel (RACH), transmitting, via the transceiver, an uplink data signal and a demodulation reference signal (DMRS) on an uplink transmission radio resource, wherein the BS receives the uplink data signal and the DMRS according to the specific preamble after receiving the specific preamble; and receiving, via the transceiver, a downlink data signal on a downlink transmission radio resource according to the specific preamble, wherein the transceiver transmits the specific preamble, the uplink data signal, and the DMRS, the BS receives the uplink data signal and the DMRS, and the transceiver receives the downlink data signal while the UE remains in the RRC inactive state or the RRC idle state and does not need to transit back into the RRC connected state.

2. The UE of claim 1, wherein the uplink transmission radio resource is pre-configured by the BS, the specific preamble has a correspondence relationship with the uplink transmission radio resource and the downlink transmission radio resource, the BS receives the uplink data signal on the uplink transmission radio resource according to the correspondence relationship after receiving the specific preamble, and the processor receives the downlink data signal on the downlink transmission radio resource via the transceiver according to the correspondence relationship.

3. The UE of claim 1, wherein the specific preamble has a correspondence relationship with the downlink transmission radio resource, the processor receives a random access response (RAR) message from the BS via the transceiver, the RAR message is generated by the BS according to the specific preamble and carries uplink transmission radio resource information and downlink transmission radio resource information, and the processor further transmits a radio resource control (RRC) request message to the BS on the uplink transmission radio resource via the transceiver according to the uplink transmission radio resource information, and receives an RRC response message on the downlink transmission radio resource from the BS via the transceiver according to the correspondence relationship.

4. The UE of claim 1, wherein the message indicating the specific preamble is a paging message, and the specific preamble has a correspondence relationship with the uplink transmission radio resource and the downlink transmission radio resource to make the processor receive another downlink data signal on the downlink transmission radio resource via the transceiver according to the paging message.

5. The UE of claim 1, wherein the processor further receives a BS group notification message indicating a BS group from the BS via the transceiver, and the BS group comprises the BS and at least one other BS.

6. The UE of claim 5, wherein the processor transmits a BS group setup request message to the BS via the transceiver to make the BS set up the BS group according to the BS group setup request message and transmit the BS group notification message.

7. The UE of claim 6, wherein the processor transmits the BS group setup request message and receives the BS group notification message from the BS via the transceiver during a process in which the UE transits from an RRC idle state into an RRC connected state.

8. The UE of claim 6, wherein the processor transmits the BS group setup request message and receives the BS group notification message from the BS via the transceiver when the UE is in an RRC connected state.

9. The UE of claim 5, wherein the processor further transmits the specific preamble to the at least one other BS on at least one other random access channel via the transceiver, and the processor further receives an RAR message from a representative BS in the BS group via the transceiver, the RAR message carries the uplink transmission radio resource information, at least one piece of other uplink transmission radio resource information, a random access preamble identifier, at least one other random access preamble identifier and master-secondary BS identification information.

10. The UE of claim 9, wherein the processor further transmits an RRC request message carrying an access stratum context identifier to the representative BS via the transceiver, the representative BS is the BS, and the processor receives an RRC response message from the BS via the transceiver.

11. The UE of claim 1, wherein the processor further transmits the specific preamble to at least one other BS on at least one other random access channel via the transceiver, and the processor further receives an RAR message from a representative BS of a BS group via the transceiver, the RAR message carries the uplink transmission radio resource information, at least one piece of other uplink transmission radio resource information, a random access preamble identifier, at least one other random access preamble identifier, BS group information and master-secondary BS identification information, wherein the BS group information indicates the BS group, and the BS group comprises the BS and at least one of the at least one other BS.

12. The UE of claim 1, wherein the processor further transmits the specific preamble to at least one other BS on at least one other random access channel via the transceiver, and the processor receives an RAR message from each of a plurality of qualified BSs in a BS group individually via the transceiver, each of the RAR messages carries a qualified uplink transmission radio resource, a random access preamble identifier and master-secondary BS identification information, and wherein the qualified BSs include the BS and at least one of the at least one other BS.

13. The UE of claim 1, wherein the processor further transmits the specific preamble to at least one other BS on at least one other random access channel via the transceiver, and the processor receives an RAR message from each of a plurality of candidate BSs individually via the transceiver, each of the RAR messages indicates a candidate uplink transmission radio resource and a random access preamble identifier, wherein the candidate BSs include the BS and at least one of the at least one other BS, the candidate uplink transmission radio resources include the uplink transmission radio resource, and the processor selects at least two of the candidate BSs as a BS group and transmits the uplink data signal on at least one of the candidate uplink transmission radio resources corresponding to the BS group via the transceiver, wherein the BS group comprises the BS.

14. The UE of claim 1, wherein the UE is in an RRC inactive state.

15. A base station (BS), comprising:
a storage, being configured to store an access stratum context identifier of a user equipment (UE) and identify the UE according to the access stratum context identifier;
a transceiver; and
a processor electrically connected to the storage and the transceiver, being configured to perform the following operations:
transmitting, via the transceiver, a message indicating a specific preamble specified by the BS for the UE,
receiving, via the transceiver, the specific preamble on a random access channel (RACH), and an uplink data signal and a demodulation reference signal (DMRS) on an uplink transmission radio resource according to the specific preamble; and
transmitting, via the transceiver, a downlink data signal on a downlink transmission radio resource according to the specific preamble
wherein the transceiver receives the specific preamble, the uplink data signal, and the DMRS, transmits the downlink data signal while the UE is maintained in an RRC inactive state or an RRC idle state.

16. The BS of claim 15, wherein the processor further performs the following operations:
receiving a BS group setup request message and transmitting a BS group notification message to the UE based on the BS group setup request message via the transceiver during a process in which the UE transits from a radio resource control (RRC) idle state into an RRC connected state or when the UE is in the RRC connected state, the BS group notification message indicating a BS group, and the BS group comprising the BS and at least one other BS.

17. The BS of claim 15, wherein the processor further performs the following operations:
transmitting an RAR message to the UE via the transceiver after receiving the specific preamble, the RAR message carrying uplink transmission radio resource information, at least one piece of other uplink transmission radio resource information, a random access preamble identifier, at least one other random access preamble identifier and master-secondary BS identification information, wherein the uplink transmission radio resource information indicates the uplink transmission radio resource.

18. The BS of claim 15, wherein the processor further performs the following operations:
receiving configuration information from at least one other BS via the transceiver after receiving the specific preamble, wherein the configuration information is generated by the at least one other BS in response to the specific preamble being received on at least one other random access channel, and carries at least one piece of other uplink transmission radio resource information and at least one other random access preamble identifier, the specific preamble is used to request setup of a BS group, and the BS group comprises the BS and the at least one other BS;
transmitting an RAR message to the UE via the transceiver, the RAR message carrying the uplink transmission radio resource information, at least one piece of other uplink transmission radio resource information, a random access preamble identifier, at least one other random access preamble identifier, master-secondary BS identification information, and BS group information indicating the BS group.

19. The BS of claim 15, wherein the processor further performs the following operations:
transmitting an access stratum context of the UE to at least one other BS; and
transmitting an RAR message to the UE via the transceiver, the RAR message carrying uplink transmission radio resource information, a random access preamble identifier and master-secondary BS identification information, wherein the uplink transmission radio resource information indicates the uplink transmission radio resource.

20. The BS of claim 15, wherein the processor further performs the following operations:
receiving an access stratum context of the UE from another BS; and
transmitting an RAR message to the UE via the transceiver, the RAR message carrying uplink transmission radio resource information, a random access preamble identifier and master-secondary BS identification information, wherein the uplink transmission radio resource information indicates the uplink transmission radio resource.

* * * * *